US012688511B2

(12) United States Patent
Llewelyn

(10) Patent No.: US 12,688,511 B2
(45) Date of Patent: Jul. 21, 2026

(54) WEARABLE FORM-FACTOR DISPLAY OF A KEEPSAKE

(71) Applicant: Renauld International, Inc, Redwood City, CA (US)

(72) Inventor: Gareth Llewelyn, Winkfield (GB)

( * ) Notice: Subject to any disclaimer, the term of this patent is extended or adjusted under 35 U.S.C. 154(b) by 110 days.

(21) Appl. No.: 18/242,794

(22) Filed: Sep. 6, 2023

(65) Prior Publication Data

US 2023/0419335 A1 Dec. 28, 2023

Related U.S. Application Data

(63) Continuation-in-part of application No. 17/575,204, filed on Jan. 13, 2022, now Pat. No. 12,277,469, which is a continuation-in-part of application No. 17/135,551, filed on Dec. 28, 2020, now abandoned, which is a continuation-in-part of application No. 16/951,855, filed on Nov. 18, 2020, now abandoned, which is a continuation-in-part of application No. 16/935,530, filed on Jul. 22, 2020, now abandoned, which is a continuation-in-part of application No. 16/867,413, filed on May 5, 2020, now Pat. No. 11,423,755, said application No. 16/951,855 is a continuation-in-part of application No. 15/917,548, filed on Mar. 9, 2018, now Pat. No. 10,884,454, which is a continuation-in-part of application No. 15/645,891, filed on Jul. 10, 2017, now Pat. No. 10,783,546, said application No. 16/867,413 is a continuation-in-part of application No. 15/645,891, filed on Jul. 10, 2017, now Pat. No. 10,783,546.

(60) Provisional application No. 62/603,163, filed on May 17, 2017.

(51) Int. Cl.
*G06Q 30/018* (2023.01)
*G06F 16/27* (2019.01)

(52) U.S. Cl.
CPC ......... *G06Q 30/0185* (2013.01); *G06F 16/27* (2019.01)

(58) Field of Classification Search
CPC ....... H04R 1/1058; G06F 1/325; G06T 19/00; G09F 23/00; A44C 5/0015; A45C 7/0031
See application file for complete search history.

(56) References Cited

U.S. PATENT DOCUMENTS

| | | | | |
|---|---|---|---|---|
| 10,568,375 B1 * | 2/2020 | Levich | ..................... | A41G 7/00 |
| 2002/0029408 A1 * | 3/2002 | Lindahl | .................. | G02C 11/08 |
| | | | | 2/426 |
| 2005/0199625 A1 * | 9/2005 | Salamone | ............ | A45C 7/0031 |
| | | | | 220/9.2 |
| 2006/0093178 A1 * | 5/2006 | Chen | .................... | H04R 1/1058 |
| | | | | 381/370 |
| 2008/0201641 A1 * | 8/2008 | Xie | ......................... | G06T 19/00 |
| | | | | 351/200 |
| 2012/0168024 A1 * | 7/2012 | Beck | .................... | A44C 25/002 |
| | | | | 141/1 |

(Continued)

*Primary Examiner* — Saba Dagnew
(74) *Attorney, Agent, or Firm* — Mohamed C. Azeez

(57) ABSTRACT

A method for manufacturing a keepsake display in an eye-wear form-factor, said method comprising the steps of: forming a transparent housing in a form-factor of an element of an eye-wear, wherein the eyewear element is at least one of a side shield, bridge, frame, or lens; filling said transparent housing with an expression of a keepsake; and coupling said keepsake-filled eyewear element to the eyewear in replacement of an original element of the eyewear for form-factored display of the keepsake.

19 Claims, 31 Drawing Sheets

(56)                    References Cited

U.S. PATENT DOCUMENTS

| | | | | |
|---|---|---|---|---|
| 2013/0154906 A1* | 6/2013 | Braun | .................... | G06F 1/325 |
| | | | | 345/8 |
| 2014/0048427 A1* | 2/2014 | Helbling | .............. | F17C 13/005 |
| | | | | 206/0.6 |
| 2014/0168597 A1* | 6/2014 | Bennett | ................. | G02C 11/02 |
| | | | | 351/51 |
| 2016/0051016 A1* | 2/2016 | Harris | ................. | A44C 5/0015 |
| | | | | 63/1.14 |
| 2017/0120665 A1* | 5/2017 | Koeppel | .................. | B42F 5/00 |

* cited by examiner

402

404

OK to Talk/Approach

NOT ok to
Talk/Approach

A square signifies it's OK to
Approach me or Talk to me

A circle signifies it's NOT ok to
Approach me or Talk to me

Basic NVP Language

These colours can be displayed with the screen around the badge or on the badge itself

610

Use of symbols to present emotions and feeling. These symbols are specific to the NVP badge.
The colours of each symbol is the same as previously 3. On receiving the signal the
badge makes a sound and can
display any image or message
defined by the NVP App 1. On pushing the button Unique Signal 2. A signal is sent to the targeted NVP badge The badge wearer aims it
at a person wearing
another badge The NVP badge
wearer pick ups
the signal Virtual NVP created on App Virtual NVP timeline shared on Facebook Virtual timeline shown on Microsite

2901

2902

3001

3002

1. Scan the Element

2. Play video 3. bid/register on 'keepsake' exchange

WEARABLE FORM-FACTOR DISPLAY OF A KEEPSAKE

FIELD OF INVENTION

The present invention relates to a housing configured for a form-factor display of a keepsake, and more particularly, relates to a scan-enabled element as part of the keepsake housing for digitally authenticating, including verifying identity, origination, and chain of custody of said keepsake, over a network.

BACKGROUND OF INVENTION

Badges have long been a mainstay in public gathering situations as a way to identify the people engaged in the public gathering. It has also been a primary way of communicating to others a level of credential to facilitate access or a professional process. While the badge has long been simply a name card, with title, and possibly a photo, they have recently morphed into digital versions. Digital badges may be operatively coupled to networked devices and be enabled to reconfigurably display items. According to one embodiment disclosed and claimed by Identity Systems, Inc. (US20150348498), the digital badge device may include a mounting means, power source, microprocessor, memory, and display to receive and display digital content from a network device according to a pre-defined rule. Identity Systems badge may be associated with an individual or employee, and then automatically display at least the name of the individual or employee based on the association and the pre-defined interaction rules between the digital badge and networked device.

Identity Systems digital badge does not disclose or claim for any digital interaction between digital badges. In other words, the badges are not configured to communicate between badges or share digital content between badges or from badge to networked device. Therefore, the badges are simply contemplated as being a visual display of identity or group/brand association—that may be dynamically displayed according to a pre-defined rule. However, it is not envisioned to serve as a true digital communication tool, that may interact with other badges, and push digital content from one badge to another badge—in a dynamic and targeted fashion.

Additionally, badge-displayed content or badge-badge shared content is not enabled for social media sharing or inclusion into a running virtual footprint of a badge wearer. What's more, without tracking of such a virtual footprint, behavior or influence ratings cannot be accurately identified in order to dynamically push targeted content.

Aside from a lack of badge-badge or badge-device interactivity or footprint tracking for targeted content delivery, digital badges lack a system or protocol for communicating an approach or further engagement of digital content interaction. More specifically, badges, such as Invent Systems, lack a symbol or color-coded display cue between users who are in their 'line of sight' (or groups of people) for communicating a permission to approach, and more particularly, further sharing of content messages, emotions, feelings, wellbeing, states of mind, general interest, marketing and advertising, and interactive behavior for likeminded people.

Digital badges need a form of a universal language for the digital communication between at least two badges or at least between badge and receiver. The communication protocol would also need to take this language into account to enable humans to act on the language interaction. Conventionally, people cannot transmit a message directly to another person who is in their line of sight without talking, signaling or using a facial expression to communicate with them. There is currently no method for a person to send an electronic signal to person in their line of sight directly. There is currently no method for an individual to display and instantly transmit their willingness to be approached, feelings, emotions, state of mind, state of like-mindedness, social media footprint, general interests and digital information or online dashboards. Furthermore, there is no global standard or universal symbol language to communicate non-verbal approach messages via badge devices. Currently, there is also no way for two likeminded people to share non-verbal content messages between badges and, or static devices.

Furthermore, there is currently no device or method for a user to wear a device with a housing configured for line-of-sight display of a first device, operably coupled to a second device for any programmable content to be consumed via the line-of-sight display. More particularly, there is currently no device or method for a user to wear a device with a housing configured for line-of-sight display of a first device, operably coupled to a second device for standardized, non-verbal approach messages to be exchanged to at least a second user for further digital interaction via the line-of-sight display.

The granted patent, U.S. Pat. No. 8,931,896B2, assigned to E-Vision Smart Optics, Inc., describes and claims an eyewear frame disposed with a docking station configured to house an electronic device for video playback and power. However, the docking station and the docked device are not intended for outward display, and rather, they are configured strictly for self-consumption. The '896 patent does not describe or claim a device or method for line-of-sight outward display of a first device, operably coupled to a second device for any programmable content or a standardized approach message to be displayed to at least a second user via the line-of-sight display.

In addition to the need for a line-of-sight color/symbol-coded display for social facility, there is currently, likewise, a need for a line-of-sight display of a physical item of sentimental (historical and/or emotional) value to commemorate an event, individual, venue, etc. Currently, commemorative items—from sports memorabilia to celebrity keepsakes—are often case displayed in its entirety for home or office display. Aside from their investment value, they also serve a décor function—not to mention a very conspicuous signal of a person's allegiances. However, these displays of allegiance are primarily affixed, whether encased in a shelf or framed on a wall, and thus, limited in visibility. There is a sore need for expanding mobility and visibility of these commemorative items or keepsakes.

The memorabilia industry, as a whole, as one can imagine, has struggled with issues of authenticity from the very inception—and the world of sports memorabilia is no exception. This world has particularly struggled with ensuring the authenticity of autographs of athletes and game-worn paraphernalia. Due to the rise in fraud, letters of authenticity (LOA) were the lifeblood of the sports collectibles industry. Typically, the LOA entails a formal review by an accredited authentication body (Baseball Historians Association of America, for instance), who upon deeming the item authentic, will issue a unique identifier with an official seal of authenticity. This process was, as one can also imagine, fraught with peril. Measures have been added to enhance security, namely a multi-step authentication process including, among other things, every autograph being witnessed by an authentication body representative; a record of the autograph signed by both the athlete and the representative; a serial-numbered hologram affixed to each signed piece of sports memorabilia; a certificate of authenticity assigned to each piece of sports memorabilia—including a matching hologram to the one affixed to the autographed item; and finally, the transaction registered for a detailed record of the chain of title. There is sorely a need for digitizing the authentication process for more visible/mobile commemorative items or keepsakes.

The display and authentication of keepsakes or memorabilia have traditionally been constrained by static, immobile frames or cases. Often, these items, laden with emotional or historical value, are showcased in their entirety within encased objects, limiting their visibility and mobility. The contemporary need to dynamically integrate keepsakes into our everyday lives, while ensuring their authenticity, remains a critical challenge in the memorabilia industry.

One innovative solution that has been proposed involves a form-factored display apparatus—one that beautifully marries form and function in a wearable item. For instance, incorporating a keepsake within a wearable apparatus such as the side shield of spectacles, allows for a seamless blend of style and sentiment. This is a significant shift from embedded display solutions, where the keepsake is merely confined within an enclosure in the wearable, restricting its visibility and engagement. Form-factor display, capitalizes on the spectacle's inherent visibility and mobility, providing an outward-facing platform for the keepsake, thus inviting interaction and conversation. However, as we integrate keepsakes into our day-to-day attire and accessories, authenticity concerns escalate. The issue of authenticity has long been the Achilles' heel of the memorabilia industry, especially in the realm of sports memorabilia. Traditional Letters of Authenticity (LOA), while serving a purpose, are susceptible to fraudulent activities.

Digital authentication solutions, such as digital certificates or Blockchain-based records, were developed as a response to such challenges. They aimed to provide robust verification, but these methods have their shortcomings. Despite their secure approach, these solutions have been hindered by usability issues, limited adoption, and a lack of seamless integration with the physical display of keepsakes. This disconnect between the physical keepsake and its digital provenance creates a disjointed experience and impedes the swift verification of authenticity. In this context, it is essential to reimagine the methods and apparatus for the display and authentication of keepsakes. An ideal solution should incorporate the form-factor of a wearable for the display and intertwine the authentication process in a more intuitive and user-friendly way. For instance, the side shield of a spectacle, being the form-factor display for a keepsake, could be linked to a digital, immutable ledger for its authenticity verification, effectively combining the physical and digital aspects of the keepsake in a unified manner.

Therefore, the shift towards form-factor displays, with enhanced visibility, mobility, and integrated authentication methods, seems to be a promising direction in solving the problems currently associated with keepsake display and authenticity. There is sorely a need for digitizing the authentication process for more visible/mobile commemorative items or keepsakes by way of a form-factored display.

SUMMARY

The non-verbal line of sight electronic communication protocol (NVP) described herein allows the viewer to instantly understand the symbol and, or color-coded display cues of the interactive badge and understand whether the individual displaying the visual cues can be: (1) approached and (2) whether an information exchange can take place immediately or in the future. It also allows the user to send and receive information that could not previously be exchanged through normal human communication means. Generally, the non-verbal line of sight electronic communication protocol (NVP) includes a standardized set of symbols, colors, and electronic communication protocol standards that enhance human communication to a new level. The NVP allows individuals to create new human behaviors and send messages beyond the natural 5 senses. The NVP allows individuals to build their own window of their life, display it on a personal digital display, and then have others interact with them. The NVP allows individuals to 'think' by creating their life window, 'act' by uploading to their personal digital display, and 'do' by using the interactive communication protocol.

The NVP allows communication between humans to take place while in their line of sight over and above their normal senses. The NVP can be implemented on any personal digital display that is running the NVP protocol. This protocol allows a signal to be passed between NVP devices only when certain combination of symbols and colors are displayed. This communication can trigger the transfer of information from one individual to another. Preferably, this NVP interaction guided by the standardized set of symbols and, or colors may be displayed on a center and, or surround visual display of an interactive badge worn by a first user, and in the line of sight by at least a second user.

It is one object of the invention to disclose a non-verbal line of sight electronic communication (NVP) system, comprising an interactive badge device with a line of sight device visual display. The device visual display being at least one of a surround device display and, or a center device display. Additionally, the device may have an interface module housed within the interactive badge device and configured for causing an event state change between at least one of a mobile device, surround device display and, or center device display. Moreover, the system may have a processor; a non-transitory storage element coupled to the processor; and encoded instructions stored in the nontransitory storage element, wherein the encoded instructions when implemented by the processor, configure the system to: (1) upload NVP interaction rules and curated NVP content for display on any one of a first user's device based on the first user's interaction rules and scheduler criteria; (2) send at least one of an interaction and, or content message based on the first user's interaction rules and scheduler criteria to at least one of a second user's device within range and contingent on the second user's interaction rules; and (3) based on the second user's interaction rules, accept or deny the first user interaction message, and if accepted, decode a unique tag to trigger a unique digital event, wherein the digital event may be at least one of an image, video, sound, vibration, flash, signal, symbol, color, text, upload, sequence, download on any one of the user's device visual display, and, or over a network.

It is another object of the invention to disclose a nonverbal line of sight electronic communication protocol. The communication protocol comprising a non-verbal symbol language for communicating wirelessly over electronic devices, including interactive badges and, or displays, between users and, or static receivers, who are in one another's line of sight; and the symbol language displayed on the interactive badge and, or display and, or static receivers communicate whether a first user can approach at least a second user or not for further digital interaction.

It is another object of the invention to provide for a device-centric, non-verbal line of sight electronic communication protocol. The device-centric, non-verbal line of sight electronic communication protocol comprising a non-verbal symbol language for communicating wirelessly over electronic devices, including an interactive badge with a line of sight device visual display, between users who are in one another's line of sight. The symbol language further comprising a set of any shaped and, or colored symbols that are programmably displayed on the device visual display, wherein the device visual display is at least one of a surround device display and, or a center device display. Furthermore, based on the programmably displayed set of shaped and, or colored symbols on the device visual display, communicate whether a first user can approach at least a second user or not for further digital interaction.

In yet another object of the invention, a device or method is provided for a line-of-sight outward display of a first device, operably coupled to a second device for any programmable content or a standardized approach message to be displayed to at least a second user via the line-of-sight display. In one aspect, a line-of-sight wearable device worn over a chest of a first user may comprise a housing defining at least a first electronic device storage location for line-of-sight display; and the first electronic device electronically coupled with a second electronic device, wherein at least one of a display or audio event on the first electronic device is caused programmably based on a pre-defined line-of-sight rule and the at least one of the display or audio event is exposed in a line-of-sight to at least a second user via the line-of-sight display of the housing worn over the chest of the first user.

Aspects and advantages of this invention may be realized in other applications, aside from the intended application of interactive badge device-mediated communication and a communication protocol thereof. Other pertinent applications that may exploit the aspects and advantages of this invention are: digital advertising and digital commerce platforms integrated into the NVP communication system and protocol. For instance, an activity footprint of a user's displayed NVP content and or replicated digital or virtual NVP content may be tracked for advertisers to target the most influential users for a brand display-for-hire. Moreover, a plurality of advertisers may bid for the most influential user's using a bidding module within the advertising platform, creating upward pressure on the brand display-for-hire fees. What's more, tracking of a user's NVP line of content displayed or virtually replicated, may enable a commerce platform or participants of the platform to push suggested digital content that is personalized to the user based on the user's running NVP content. Yet another digital event that may be triggered: may be the interaction of the badge device with other badge devices or fixed-access devices near access-gates, wherein the symbol and, or color-coded display on badge or fixed-access devices invite for approach; once approached and interacted with, uploading an authentication tag over a network to a remote server; validating the authentication tag against a library of authenticated tags; downloading the validated tag and using the symbol and color-coded display on the badge device or fixed-access device to communicate permission to access. Additional digital events may include enabling the same interactive badge devices or fixed-access devices to process payment transactions, over a network, via an intermediary payment system.

Other aspects and advantages of the invention may be a device housing a first device, such as, but not limited to, a smart watch, to be worn over the chest of a user and configured for outward line-of-sight display of programmable content. Content may be a standardized symbol and, or color-coded permission to approach and digitally interact with. Alternatively, depending on the line-of-sight rule defined by the user, the content may simply be a static or loop of images or video for consumption by at least another user. Line-of-sight display may also cover for display of physical contents, rather than just a color/symbol coded display or programmable content. These physical contents may be a pulverized expression or any portion of any physical item of commemorative (historical or and/or emotional value)—hereinafter referred to as a keepsake. This portion of keepsake or keepsake may be further embedded into any traditional wearable device for line-of-sight display of the keepsake. Further yet, the embedded keepsake comprises: a first (at least partially) transparent element/surface; at least a second (at least partially) transparent element/surface; said first element/surface joined with said second element/surface in a male-female fashion (tongue-groove, for instance) to form a keepsake housing with a cavity; said cavity within the housing filled with a pulverized expression of the keepsake for display via the transparent housing; and the filled keepsake housing embedded within at least one of a housing, display, control pad, frame, or lens of the wearable for display of the keepsake.

In other aspects, the embedded keepsake may be digitally authenticated by comprising: a transparent/clear enclosure to form a keepsake housing; said housing filled with a pulverized expression of the keepsake for display via the transparent housing/enclosure; the filled keepsake housing embedded within any portion of the wearable device; and wherein at least one of an authentication, including for at least one of a status, origination, or chain of custody of the keepsake is derived from an immutable ledger over a network.

In a preferred embodiment, an innovative approach to keepsake display is introduced through the concept of a form-factored keepsake display apparatus. This new design fundamentally shifts the way keepsakes are incorporated into everyday life. The apparatus consists of a clear housing designed to mimic an element of a wearable device, such as the side shield of a spectacle. The keepsake becomes a part of the wearable, significantly increasing its visibility and creating a more interactive user experience.

In another embodiment, the keepsake isn't limited to a specific form or type. Instead, any physical item with historical or emotional value can be used. Moreover, to fit into the clear enclosure of the wearable device, the keepsake can be transformed or pulverized into varying degrees of granularity. This feature allows for an adaptable and expressive display, where the keepsake can be artistically integrated into the form-factor of the wearable component while preserving its sentimental significance.

Alternatively, in one embodiment, the apparatus integrates a scanning element capable of verifying the keepsake's authenticity through a digital ledger system. Users can scan the keepsake to confirm its authenticity, status, origination, or chain of custody over a network. This sophisticated authentication method bridges the physical and digital aspects of the keepsake, providing a comprehensive solution to the pressing problem of authenticity verification in the memorabilia industry.

In a different embodiment, the form-factored keepsake display apparatus considers practical concerns such as repair or transfer of the wearable device. It includes a provision for removing the keepsake housing from the wearable device, ensuring that the keepsake does not interfere with potential repairs or device transfer.

Finally, the approach outlines a method for manufacturing a keepsake display in an eyewear form-factor. This process involves creating a transparent housing, filling it with an expression of a keepsake, and then integrating it into the eyewear in place of an original element, allowing for the keepsake's form-factored display.

In summary, the innovative concept of a form-factored keepsake display apparatus fundamentally transforms the display and authentication of keepsakes through integration into wearable devices. This advancement could significantly impact the memorabilia industry, enhancing visibility, interaction, authenticity verification, and practical usability of keepsake displays.

Yet other aspects and advantages of the invention may be apparent from the following description and the appended claims.

BRIEF DESCRIPTION OF FIGURES

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiment and not by others. Similarly, various requirements are described which may be requirements for some embodiments but not other embodiments.

Overview

The present disclosure relates to a new non-verbal language that has been developed for the emerging electronic line of sight badge communication. The language will be referred to in the document as NVP which an abbreviation of Non Verbal person to person line of sight communication protocol standard. NVP is both a language and a communication protocol and this document initially describes both and then gives examples of how this is programmed and then examples or actual uses in the identified markets.

Exemplary Environment

Figure 1:
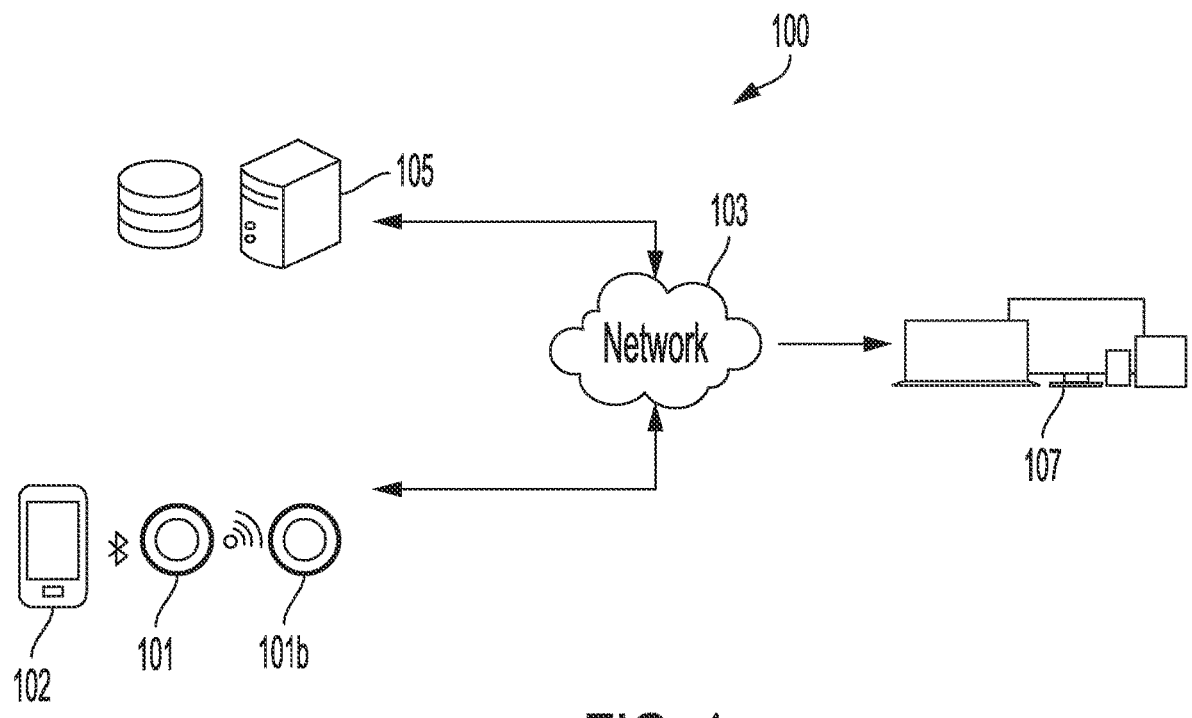
FIG. 1 illustrates a network diagram of the NVP communication system in accordance with an aspect of the invention.

Now in reference to FIG. 1. FIG. 1 illustrates an exemplary system environment 100 in which various embodiments of the non-verbal line of sight communication protocol system (NVP) can be practiced. In accordance with an exemplary embodiment, the NVP system 100 comprises: an interactive badge device 101a, 101b with a line of sight device visual display; the device visual display being at least one of a surround device display and, or a center device display; a processor; a non-transitory storage element coupled to the processor; encoded instructions stored in the non-transitory storage element, wherein the encoded instructions when implemented by the processor, configure the system 100 to: upload NVP interaction rules and curated NVP content for display on any one of a first user's interactive badge device 101a based on the first user's interaction rules and scheduler criteria; send at least one of an interaction and, or content message based on the first user's interaction rules and scheduler criteria to at least one of a second user's interactive badge device 101b within range and contingent on the second user's interaction rules; and based on the second user's interaction rules, accept or deny the first user interaction message, and if accepted, decode a unique tag to trigger a unique digital event, wherein the digital event may be at least one of an image, video, sound, vibration, flash, signal, symbol, color, text, sequence, upload, download on any one of the user's device visual display and, or over a network.

The network 103 may be any suitable wired network, wireless network, a combination of these or any other conventional network, without limiting the scope of the present invention. Few examples may include a LAN or wireless LAN connection, an Internet connection, a point-to-point connection, or other network connection and combinations thereof. The network 103 may be any other type of network that is capable of transmitting or receiving data to/from client-side devices 107, including host computers, personal devices, telephones, video/image capturing devices, video/image servers, or any other electronic devices. Further, the network 103 is capable of transmitting/sending data between the mentioned devices. Additionally, the network 103 may be a local, regional, or global communication network, for example, an enterprise telecommunication network, the Internet, a global mobile communication network, or any combination of similar networks. The network 103 may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. The network 103 may include any software, hardware, or computer applications that can provide a medium to exchange signals or data in any of the formats known in the art, related art, or developed later.

In a preferred embodiment, the line of sight interactive digital badge device (badge device) 101a, 101b is worn on one or more body parts of the user, such as chest, wrist, waist, neck, arm, leg, abdomen, thigh, head, etc. Further, the badge device 101a, 101b may be a wristband, a watch, an armband, a necklace, a headband, an earring, a waist belt and, or a ring.

Alternatively, the badge device may be any reconfigurable display that may be temporarily or permanently affixed onto a garment of a user. In yet other alternative embodiments, the reconfigurable display may be a flexible OLED tube or screen interwoven into the fabric of the garment. Badge devices 101a, 101b may have a device visual display that is situated in any one of a person's line of sight. The device visual display may be a single center display, wherein the symbol and, or color-coded visual display cueing a permission to approach and further interact is displayed on the single, center visual display. The same single, center visual display may also display the NVP content. The same display may also be enabled for touch-screen interactivity. In other embodiments, interaction with the display contents may be controlled by controls disposed on a side, top, or bottom wall of a (circular or square) device casing. In yet other embodiments, the device visual display may be comprised of a dual display: a center device display and a surround device display. Each display sharing display functions or having unique display functions. For instance, in some embodiments, the surround device display may display the symbol and, or color-coded visual cues encoding for a permission to approach and interact, while the center device display may strictly display the actual NVP content (a static or a rolling line of user-content images).

In some embodiments of the badge device 101a, 101b, sensors may be disposed within the (domed) device housing, or on the (circular or square) device casing, to capture at least one of a user environmental or contextual data to further inform a user mood, emotion, physical condition, mental well-being, and, or willingness to be approached by other digital badge users for further interaction. The digital badge device 101a, 101b is first sent to the mobile communication device 102 and thereby, sent to the processing unit over the network 103. The digital badge device 101a, 101b communicates with the mobile communication device 102 over a short range wireless communication medium, such as Bluetooth, etc. In other embodiments, sensor input may be derived from devices other than the badge device 101a, 101b. Device input may also encompass the sensor-captured raw data input or transduced and processed data input from any other device associated with the user, such as devices worn, mobile devices, and, or fixed-access devices, such as Internet-of-Things devices (e.g. smart thermostat, home automation consoles, etc.). The plurality of device inputs provides additional input for aggregation and behavior profiling, thus layering the behavior profile with additional context for generating a higher fidelity of user mood, emotion, well-being, etc. This higher resolution of user profiling may update the user interaction rules and, or policy for determining access for approach and activating further digital event/content interaction.

In continuing reference to FIG. 1 and the exemplary environment of the NVP system, a mobile communication device 102, such as a smart phone, is a portable device that has the capability of communicating over the network 103, presenting dashboard provisioning based on a respective digital badge device 101*a*, 101*b* pairing. Examples of the mobile communication device 102 include, but are not limited to, a smartphone, a tablet, a personal digital assistant (PDA) and a mobile phone. The mobile communication device 102 may be paired with a respective digital badge device 101*a*, 101*b* over a short range wireless communication medium.

Examples of the short range wireless communication medium include Bluetooth, ZigBee, Infrared, Near Field Communication (NFC) and, or Radio-frequency identification (RFID). Likewise, the digital badge device 101*a*, 101*b* may interact with other digital badge devices 101*a*, 101*b* using a short-range communication protocol, such as Infrared, Bluetooth, ZigBee, NFC, and, or RFID.

Preferred embodiments may include the addition of a remote server 105 or cloud server to further provide for back-end functionality and support. The server 105 may be situated adjacent or remotely from the system 100 and connected to each system 100 via a communication network 103. In one embodiment, the server 105 may be used to support user behavior profiling; user history function; predictive learning/analytics; alert function; network sharing function; digital footprint tracking; e-commerce/advertising platform support, etc. The remote server 105 may be further configured to authenticate the user and retrieve data of the user, device, and, or network and applies the data against a library of validated user information for enabling a payment or ticket transaction at a fixed-access point deploying an embodiment of the interactive badge device 101*a*, 101*b*.

Figure 2:
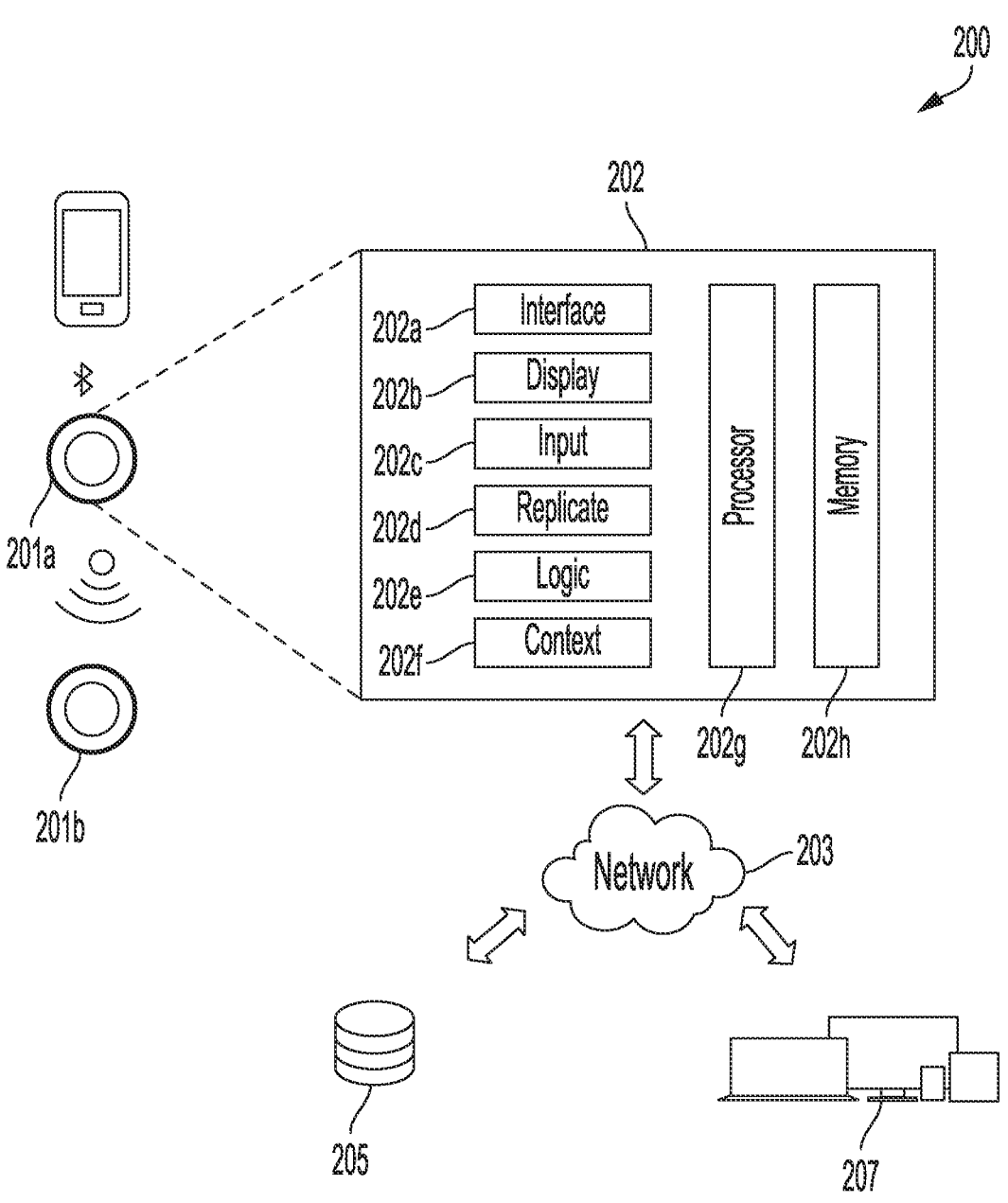
FIG. 2 illustrates a block diagram of the NVP communication system in accordance with an aspect of the invention.
Figure 3:
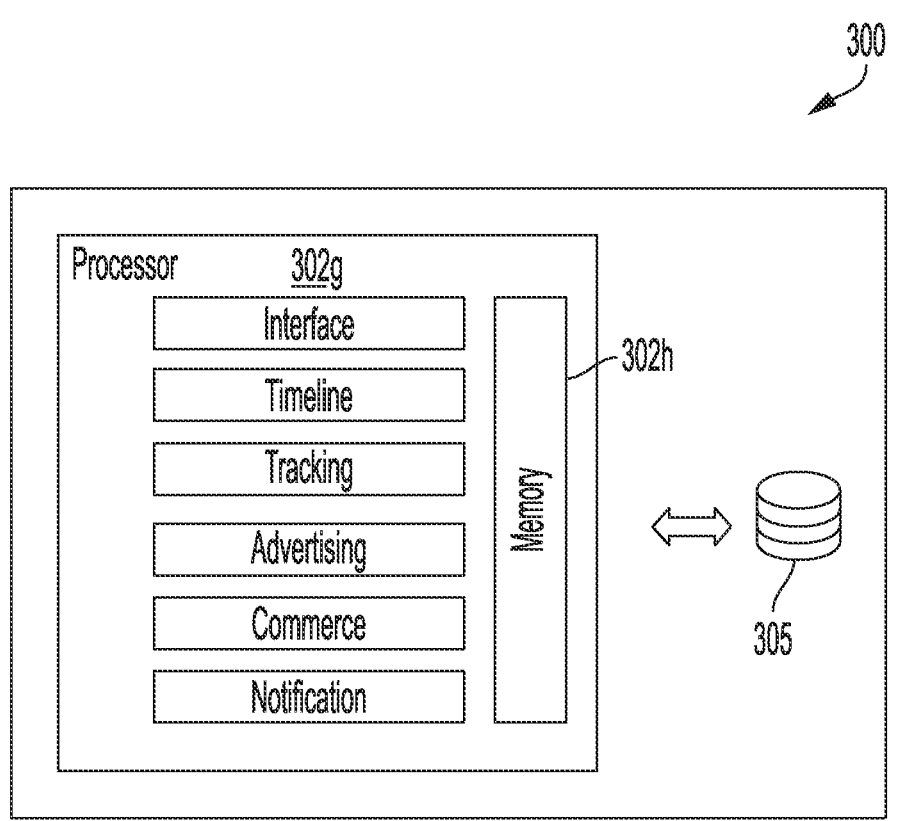
FIG. 3 illustrates a block diagram of the NVP communication system in accordance with an aspect of the invention.

Now in reference to FIGS. 2 and 3. FIGS. 2 and 3 both illustrate an exemplary embodiment of the NVP system 200. FIGS. 2 and 3 illustrate an exemplary processing unit 202*g*, 302*g* used for displaying a visual cue for permission to approach and, or a content display for exchange between interactive badge devices 201*a*, 201*b* or sharing over a network 203. As shown, the processing unit 202*g*, 302*g* may be communicatively coupled to at least one of an interface module 202*a*, display module 202*b*, input module 202*c*, replicate module 202*d*, a logic module 202*e*, a context module 202*f*, an interface module, a timeline module, a tracking module, an advertising module, a notification module, and a commerce module. The processor 202*g*, 302*g* may also communicatively coupled to a remote database 205, 305, client-side devices 207, and a memory 202*h*, 302*h*.

In an embodiment of the present invention, the processor 202*g*, 302*g* includes a notification/alerting module. The notification/alerting module is configured to generate reports at regular intervals (such as daily at 12:00 PM, weekly and monthly), on-demand when the user requests for a report corresponding to the user), or when triggered by a digital event. Typically, a digital event may be defined as any digital display for badge-badge display or network sharing or server authentication. The notification/alerting module may double up as a tracking module, wherein a user may keep track of his or her physical displays and interactions, as well as his or her virtual displays and interactions. In an embodiment of the present invention, the notification/alerting module may also be configured to send a notification to the user of the growing social influence of a user. In other words, an influence metric may be pushed quantifying how may people I have interacted with, and how many times my virtual NVP line of content been shared with other users on social media. The notification may be a message, a phone call or any other communication means.

In an embodiment of the present invention, the processor 202*g*, 302*g* includes a timeline module. The NVP line of content may be displayed or pushed in at least one of a static, dynamic and, or scheduled fashion on at least one of the user's center device display based on at least one of the user's scheduler criteria. The line of static, dynamic, and, or scheduled images and, or video NVP content from at least one of the user's to be displayed on at least one of the user's center device display may be curated by the user, pre-set, or dynamically pushed based on any one of user parameter. In some embodiments, the timeline module enables the displayed line of static, dynamic, and, or scheduled images and, or video NVP content to be further replicated on at least one of a digital and, or virtual presence of at least one the users. In other words, the timeline module enables the displayed line of NVP content to be further shared with social media and digital media outlets, over a network. In some embodiments, an Application Programming Interface may be integrated and configured for enabling transfer and, or further interaction of the replicated line of static, dynamic, and, or scheduled images and, or video NVP content.

The processor 202*g*, 302*g* may include an advertising module and, or a commerce module, enabling advertisers to target users for NVP content display based on NVP activity or influence of said users. The advertising module may further comprise a bidding module, wherein the advertisers bid among each other for engaging a user for incorporating a winning bid advertisement into the NVP content display of the user. The processor 202*g*, 302*g* may further comprise a commerce module, wherein users may purchase digital downloads of NVP content for NVP content display. The commerce module may further be coupled to a distributive digital ledger, wherein each NVP exchange among any user is represented as a unique node in the digital ledger. Each node tagged with meta data facilitating at least one of a transaction, validation and, or registration for each NVP exchange.

In some embodiments, any one of the processor functioning mentioned above may be off-loaded to the processor of the mobile device and, or the remote server. The device display may simply be used for display function—for both symbol and color-coded display cues on any one of the surround display and, or center display, and NVP line of content on the center display.

Exemplary Communication Protocol

The NVP language is made up of symbols, shapes, colors and images that when combined form a language specifically for the person to person or groups of people interactive badge or screen market. This language is the only language that allows individuals to communicate with the interactive badge in a visual sense. The NVP may be displayed on a surrounding of the interactive badge device and, or on device center display. In some embodiments, the surround display and center display may be combined in unison, or in a sequential manner, to express the NVP language.

The NVP Language Components

Figure 4:
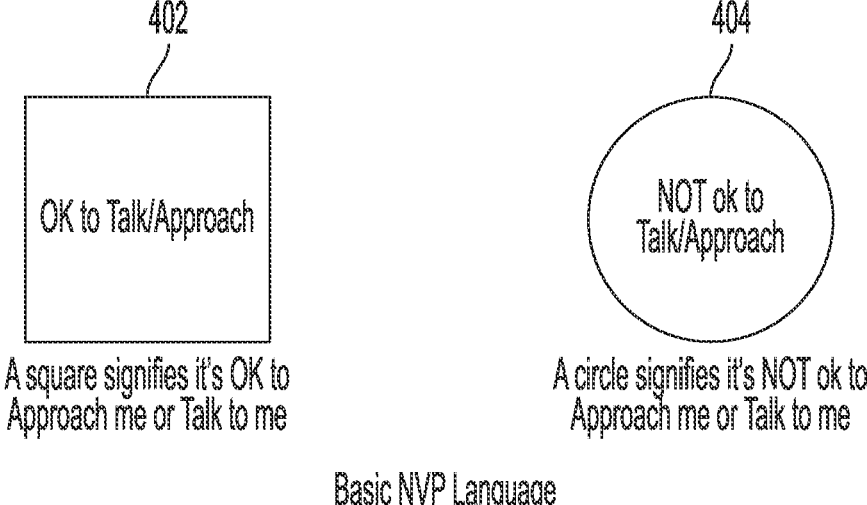
FIG. 4 illustrates a symbol and, or color-coded NVP communication protocol in accordance with an aspect of the invention.

The first component of the language is a shape such as but not limited to a square, circle, triangle or star. These shapes indicate to the viewer a behavioral welcoming state of the person viewing them. One such behavioral state might be a welcome to communicate or not as the case might be. An example of these shapes and their uses are shown in FIG. 4. This first component forms the frame of all the communication symbols to follow. It is programmed by the NVP wearer at the start of a badges or screen or display wearing session.

Figure 5:
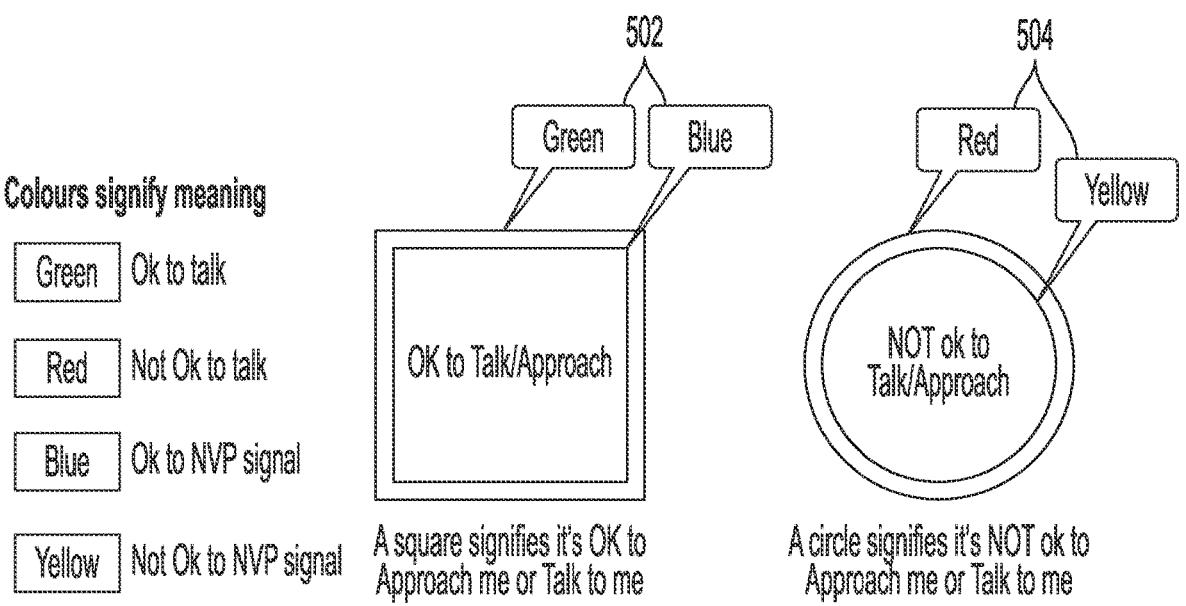
FIG. 5 illustrates a symbol and, or color-coded NVP communication protocol in accordance with an aspect of the invention.

The second component of the NVP is the color of the first component. This color signifies the rules of communication and engagement with the wearer and the receiver. The color signifies whether a person is willing to accept a communication and what type of communication from the viewer. The color can be part of the symbol or a color displayed on or around the badge An example of this is shown in FIG. 5.

Figure 6:
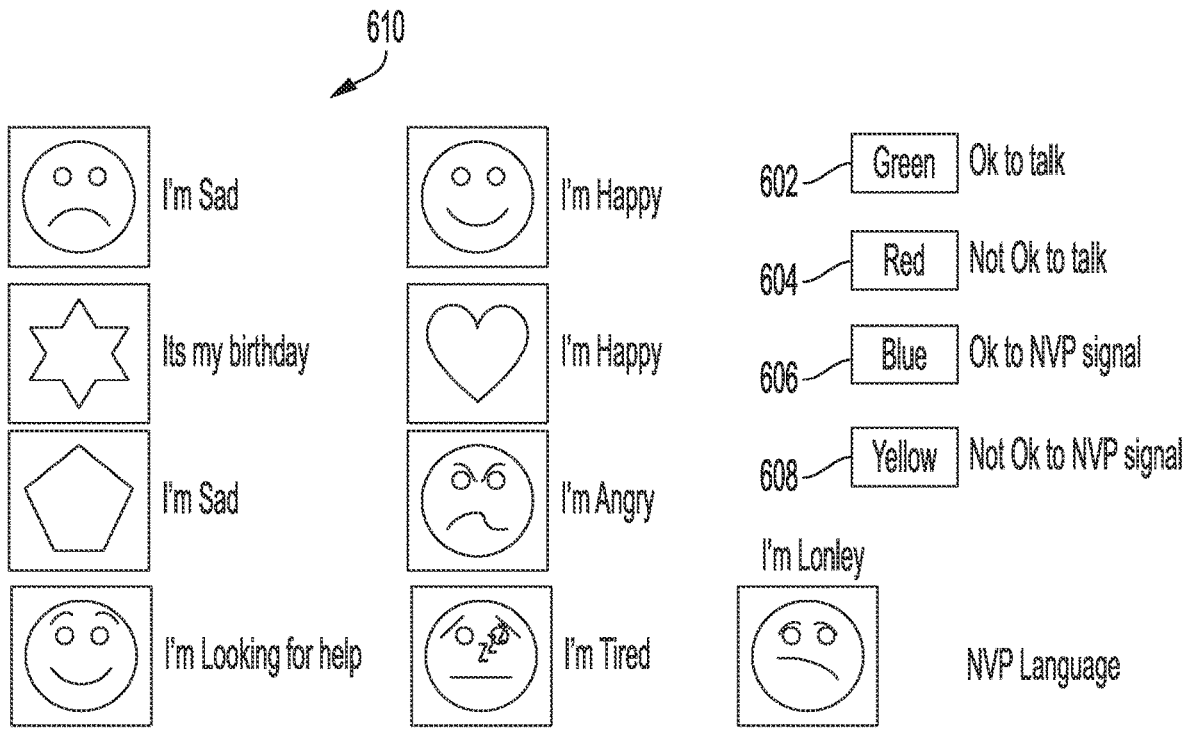
FIG. 6 illustrates a symbol and, or color-coded NVP communication protocol in accordance with an aspect of the invention.

The third component of the NVP is the symbol within the colored shape. These symbols can be anything which conveys a message to the viewer from the wearer but can only be shown using the NVP programming protocol described later. These symbols can be programed to be shown for a certain amount of time using the NVP programming software scheduler and these symbols can also flash based on that scheduler. These symbols can be different colors based on the person's mood. Some examples of the symbols for NVP are shown in FIG. 6.

In a preferred embodiment, disclosed is a non-verbal line of sight electronic communication protocol, the protocol comprising a non-verbal symbol language for communicating wirelessly over electronic devices, including interactive badges and, or displays, between users and, or static receivers, who are in one another's line of sight; and the symbol language displayed on the interactive badge and, or display and, or static receivers communicate whether a first user can approach at least a second user or not for further digital interaction.

For instance, the interactive badge or display that is displaying a blue square 402, 502, 602, which indicates that it's ok to approach me. Inside of which a green square 606 indicates its ok to talk to me and send me a NVP communication and a lonely face 610 from the symbols show that I am lonely. This symbol is programmed to the badge using the NVP programming language software which allows for timing and scheduling. The color of the symbol is the open or closed gateway to the receiver. If the color is not correct the communication will not pass. Alternatively, in other embodiments, any combination of shapes and, or colors may be arbitrarily chosen to signify a permission to approach or activate a further digital content interaction. For instance, a green circle might suggest permission to approach, and a blue square contained therein may suggest a permission to exchange an NVP line of content. Choice of colors, symbols, and the interaction with each, may be purely arbitrary.

The NVP Programming Interface

Figure 7:
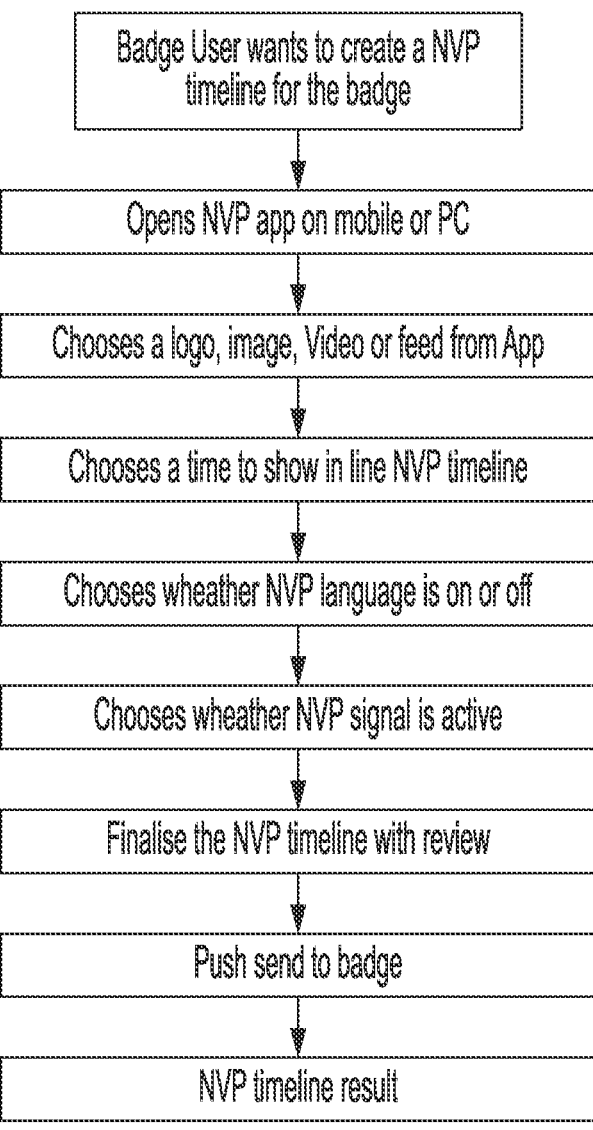
FIG. 7 illustrates an NVP content programming process flow in accordance with an aspect of the invention.
Figure 8:
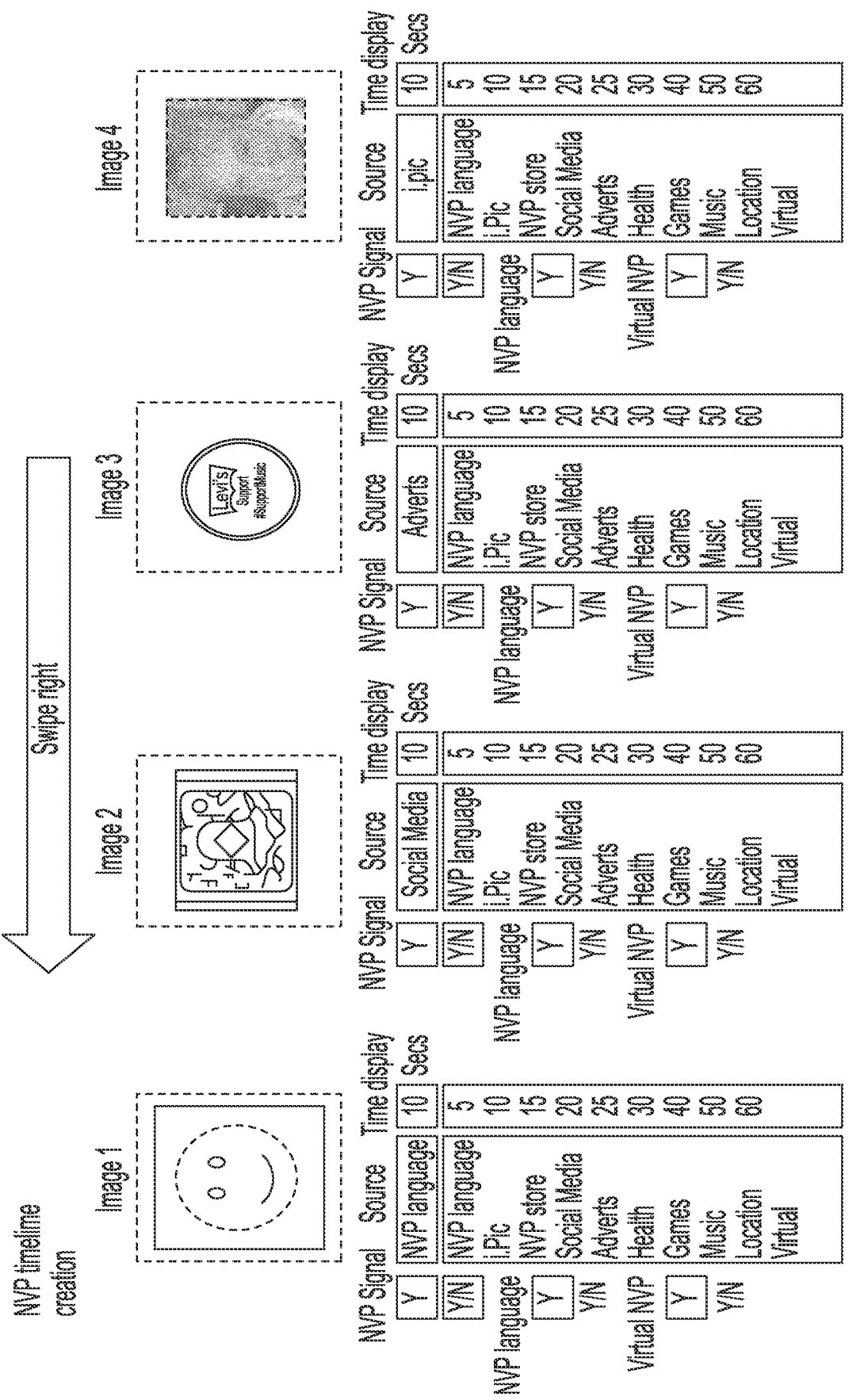
FIG. 8 illustrates a screen shot of a scheduler criteria in accordance with an aspect of the invention.
Figure 9:
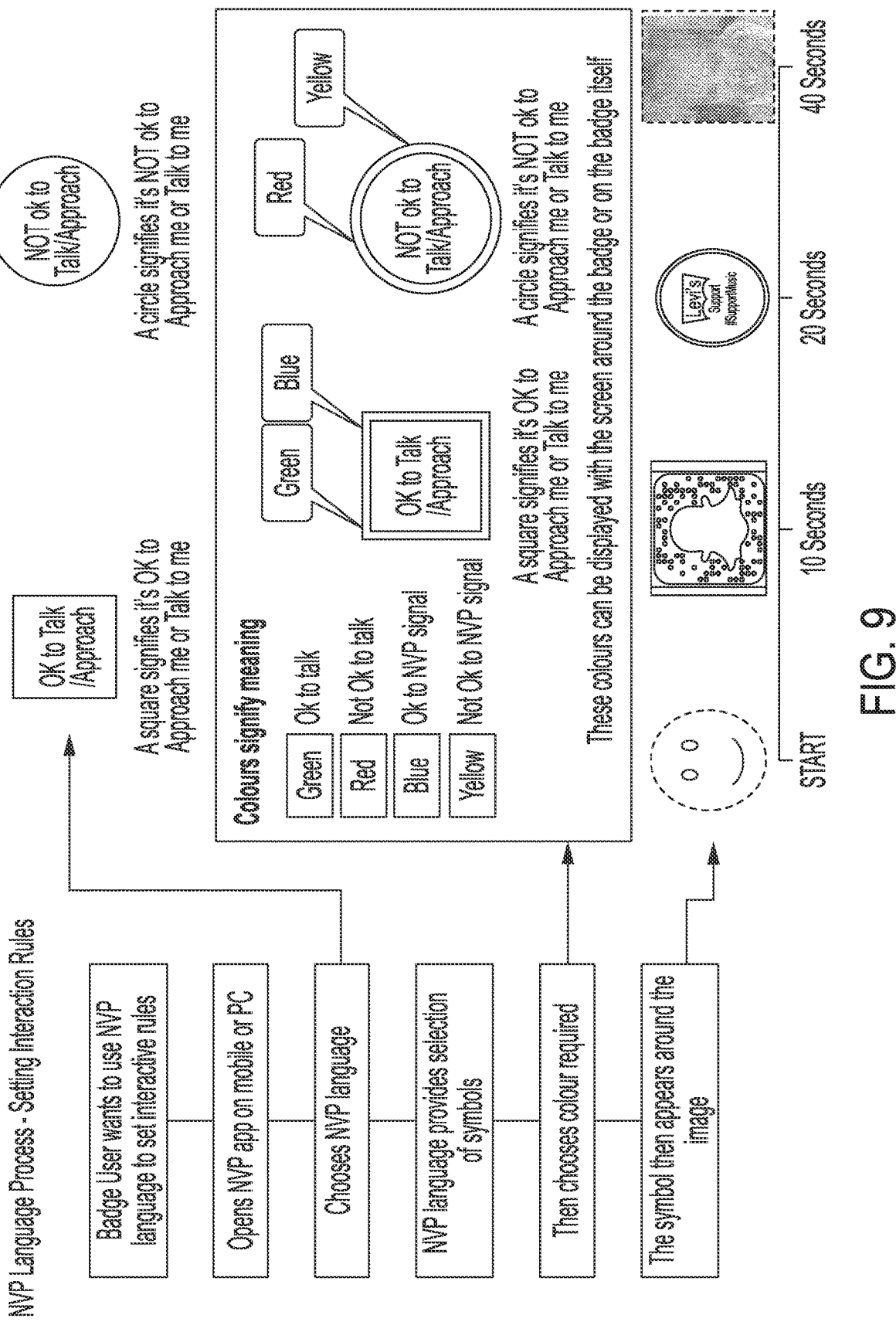
FIG. 9 illustrates an interaction rule process flow in accordance with an aspect of the invention.
Figure 10:
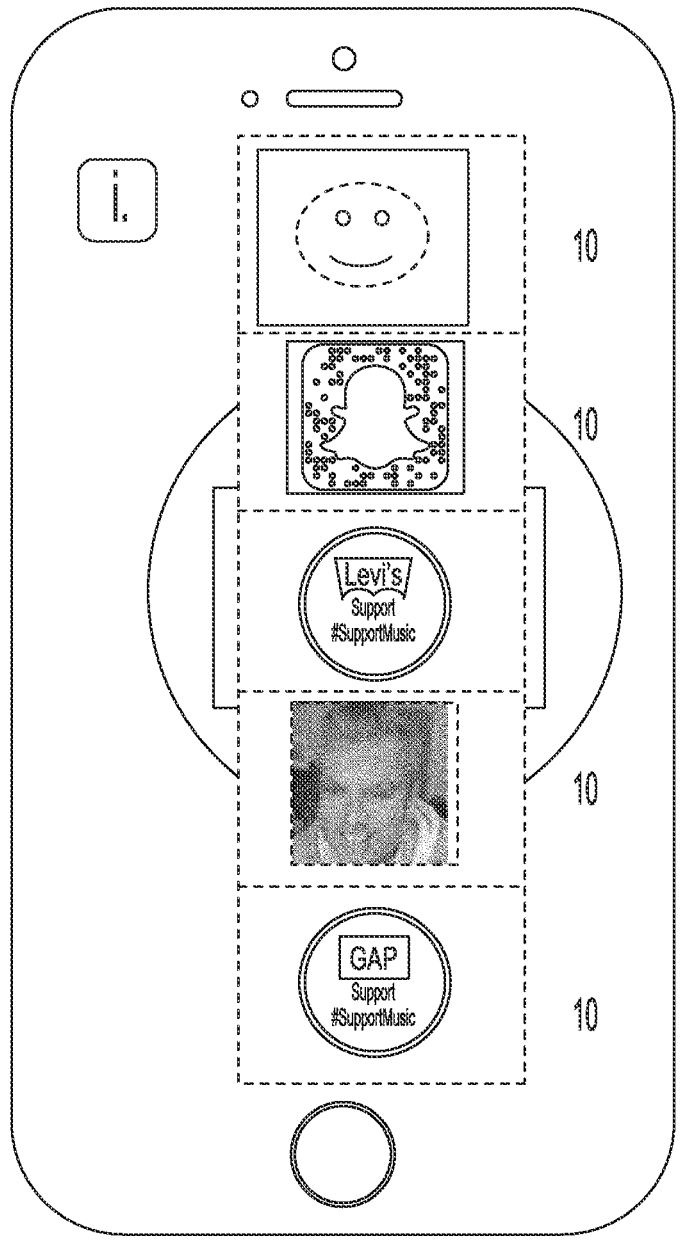
FIG. 10 illustrates a screen-shot of an NVP content display in accordance with an aspect of the invention.

To allow a wearer to program their interactive badge or personal digital display, a programming interface is required which allows the wearer to set up the language on the badge and run it throughout a day as a timeline. This requires a process which is described in detail in FIG. 7. In a preferred embodiment of the process, the wearer decides to program the badge or display with the NVP language; the program which runs on the connected device (smartphone or PC) is opened and the language variables are displayed; the NVP language components 1, 2 and 3 can be selected; the ability to send a communication to another wearer can be selected; and the ability to send the entire NVP wearers timeline can be selected. Additionally, the NVP program allows the wearer to select images from their own images, from the NVP store, feeds from interfaces with social media applications, from adverts selected from the NVP advertising platform, from health devices, from games, music and programming from a specific GPS location. Additionally, the amount of time an image is displayed may be programmed with the resulting timeline transmitted from the device to the wearable badge (FIG. 8). The process for setting the rules of interaction and engagement is further set out in FIG. 9. Once the NVP time line is set, this is transmitted to the badge and can be altered in real time. An example of this in vertical format is shown in FIG. 10. Alternatively, the line of NVP content may be depicted or scrolled in a horizontal fashion.

The NVP Communication Protocol Standard

Figure 11:
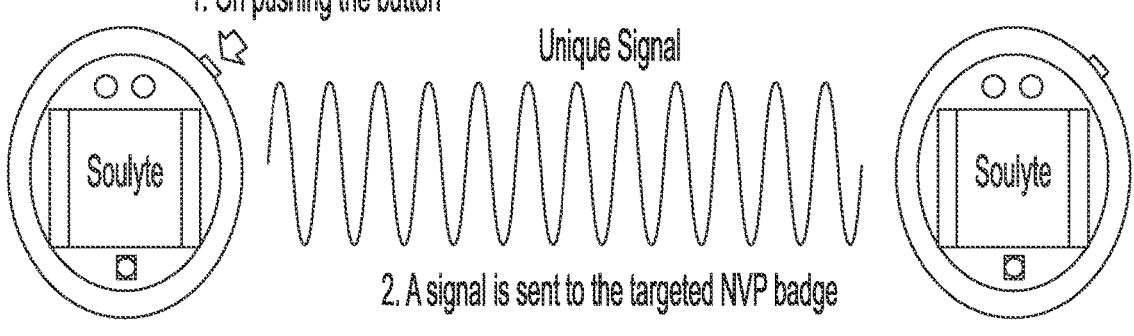
FIG. 11 illustrates a badge-to-badge interaction in accordance with an aspect of the invention.

As illustrated in FIG. 11, the NVP communication system allows one individual who is wearing an interactive badge or screen—in the line of sight of another individual wearing the same—to send messages wirelessly based on the NVP displayed. The message can only be sent if the NVP is set to the correct parameters set out in the NVP language section of this document.

The NVP protocol has a unique number attached which allows the receiving interactive badge or screen to decode it and activate an event such as but not limited to an image display, a sound played, a vibration, or a signal sent back to the sender or a signal being sent to the parent smartphone, which in turn activates an event.

This NVP signal is defined as a unique wireless signal sent from one interactive badge or screen to another over a certain physical distance in line of sight. Using the NVP signal, the interactive badge can send an NVP signal to any number of badges or receivers and the badge can accept an NVP signal from any number of badges. The NVP signal can only be accepted if the correct NVP symbols are being displayed. By accepting an NVP signal this can trigger the interactive badge or screen to display anything it's been programmed to by the NVP app running on the smartphone or PC. If accepting the NVP signal this can trigger a sound or vibration or cause a device to trigger a sound or device. On accepting the NVP signal this can trigger the NVP app running on the smartphone to activate an event or process. On accepting the NVP signal, this can trigger the interactive badge or screen via the NVP app to display a set of offers, images, videos or sounds.

In a preferred embodiment, a non-verbal line of sight electronic communication protocol is disclosed, the protocol comprising: a non-verbal symbol language for communicating wirelessly over electronic devices, including an interactive badge with a line of sight device visual display, between users who are in one another's line of sight; the symbol language further comprising a set of any shaped and, or colored symbols that are programmably displayed on the device visual display, wherein the device visual display is at least one of a surround device display and, or a center device display; and based on the programmably displayed set of shaped and, or colored symbols on the device visual display, communicate whether a first user can approach at least a second user or not for further digital interaction.

The technology used to send and receive the NVP signal can be at a specific frequency with a unique number. This has the effect of making any other device not able to recognize the NVP signal or be able to manage the events that have been set by parameters with in the App. This unique number and encryption method makes the NVP interactive badge or screen only recognizable with another NVP interactive badge or screen or receiver or a licensed piece of hardware and software from the NVP group of products. This will be a critical area of protection for the NVP language and protocol—as without it—other manufacturers will not be able to enter the market as people will not be able to interact with their badge. The NVP language is the standard for interactive badges and devices. In short, the NVP signal can be a visual equivalent of a click through.

The Virtual NVP Line

Figure 12:
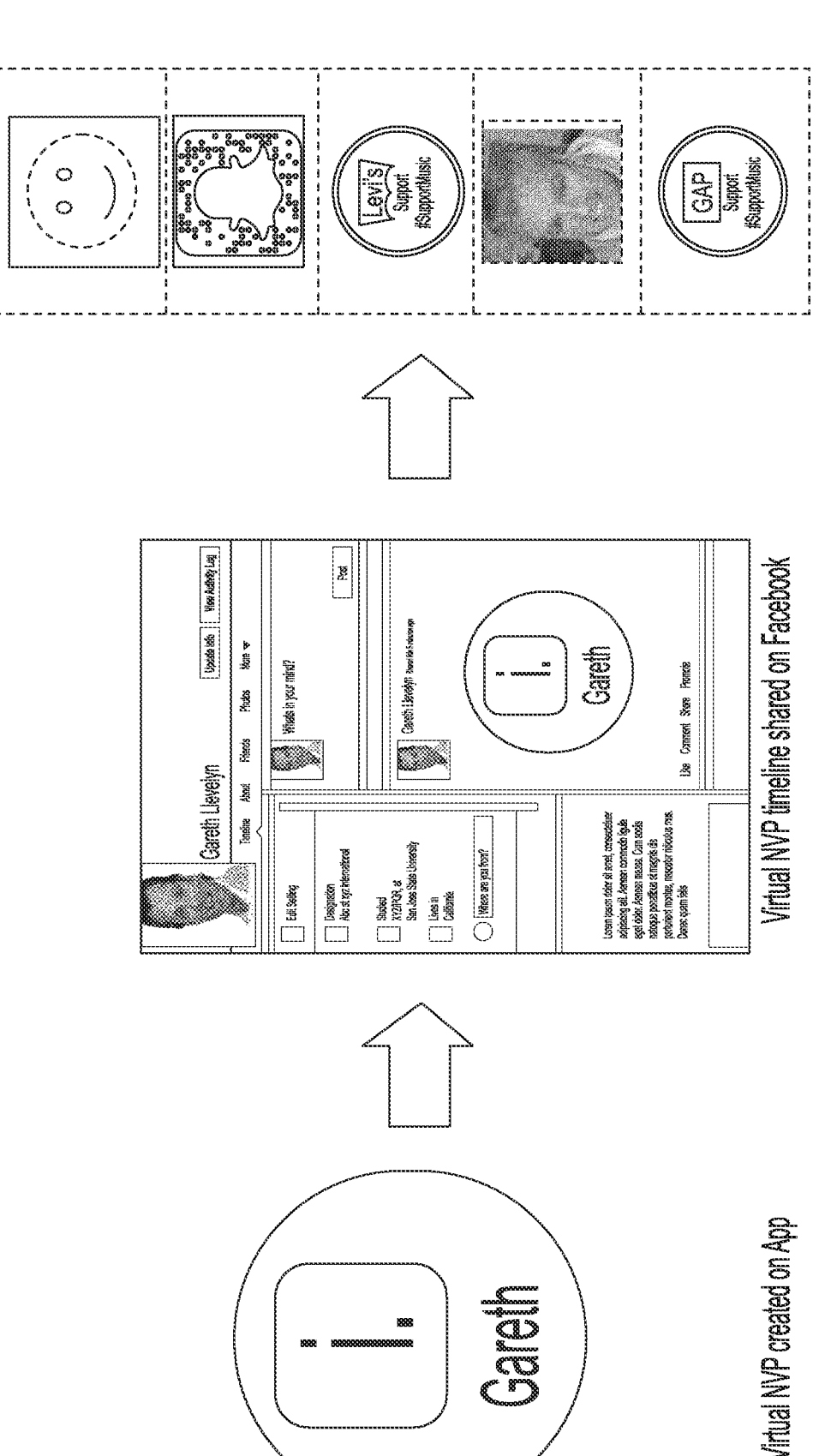
FIG. 12 illustrates an NVP content flow in accordance with an aspect of the invention.

FIG. 12 illustrates the transition from badge 1 display; share with badge 2; and digital media share of badge 1 display with tracked footprint (badge 2 share). Virtual NVP is the digital version of the visual NVP line shown on the interactive badge or screen that can be made available to NVP badge users so they can see what others are displaying on their NVP badges that day. There are two uses for the Virtual NVP line: 1) to allow NVP badge wearers to transmit their NVP line from one user to another; and 2) to allow NVP badge wearer to attached their own.

The pre-defined presentation of the content message on at least the interactive device visual display and, or virtual profile may be configured for network or digital sharing. Furthermore, the virtual profile may, via an Application Programming Interface, be configured for transfer and, or further interaction—such as geo-location, site check-in, etc. In other embodiments, the NVP system has been developed so there is a very low entry point for integration to the program. In fact, as the user is only taking a screen shot of their phone for any media there is no integration with $3^{rd}$ parties necessary. By way of an example, a user could construct a NVP line of their Facebook post, Twitter post, dashboard from Fitbit, images from their phone and a mood image. All of these can be taken directly from screenshots with no outside integration from developers needed. These screen shots can be real time based on the time of NVP line creation.

In some embodiments, live data feeds from monitoring devices would be image related, so rather than display on the device, a mirroring program would allow the device display to be shown on the NVP badge via Bluetooth. This NVP 'Llego' block is a universal interface to all monitoring and real time feed devices.

As each person is responsible for their own NVP line they are responsible for the content that is published. However, the NVP system has a safe guard to ensure that inappropriate and copyright content is not displayed. Each time an NVP line is created it must pass through the NVP 'Llego' Block server to pick up any illegal images. If this happens, the NVP line will be rejected and the user asked to review the images. The NVP 'Llego' block interface allows media channels to display their content on the NVP badge if the user so wishes. These channels are passed through the NVP Llego block centrally and are available for users to connect to if they so wish using the NVP line creation software. There are many markets for the NVP interactive language and its communication protocol. The application that follow are just some examples.

Application 1:

Advertising Targeting

Figure 14:
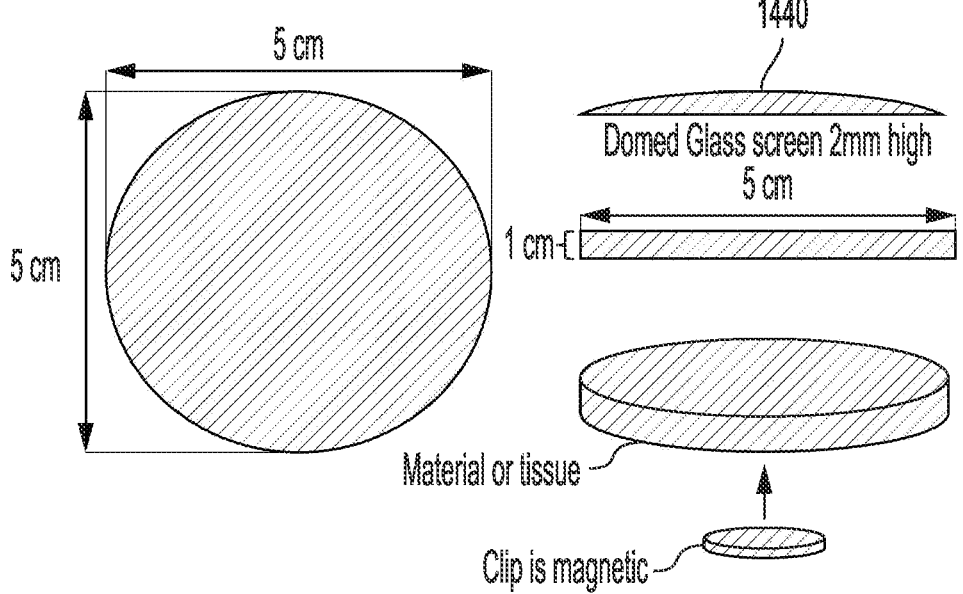
FIG. 14 illustrates exemplary dimensions of the line-of-sight device in accordance with an aspect of the invention.

The groups are based not on where you are digitally i.e. Facebook or Twitter but where you are physically i.e. on a train, at a concert, at a bar or at work. We will be able to count how many NVP signals were sent to individuals and what they reacted to. In this way new physical influencers will emerge, i.e. those who are the most popular. These peoples virtual NVP lines will be the most desirable from an advertising perspective as they will enhance their online profile with that running on their interactive badges or screens. The diagram in FIG. 14 shows what might typically happen to a person wearing and actively using the NVP language on a daily basis.

Figure 13:
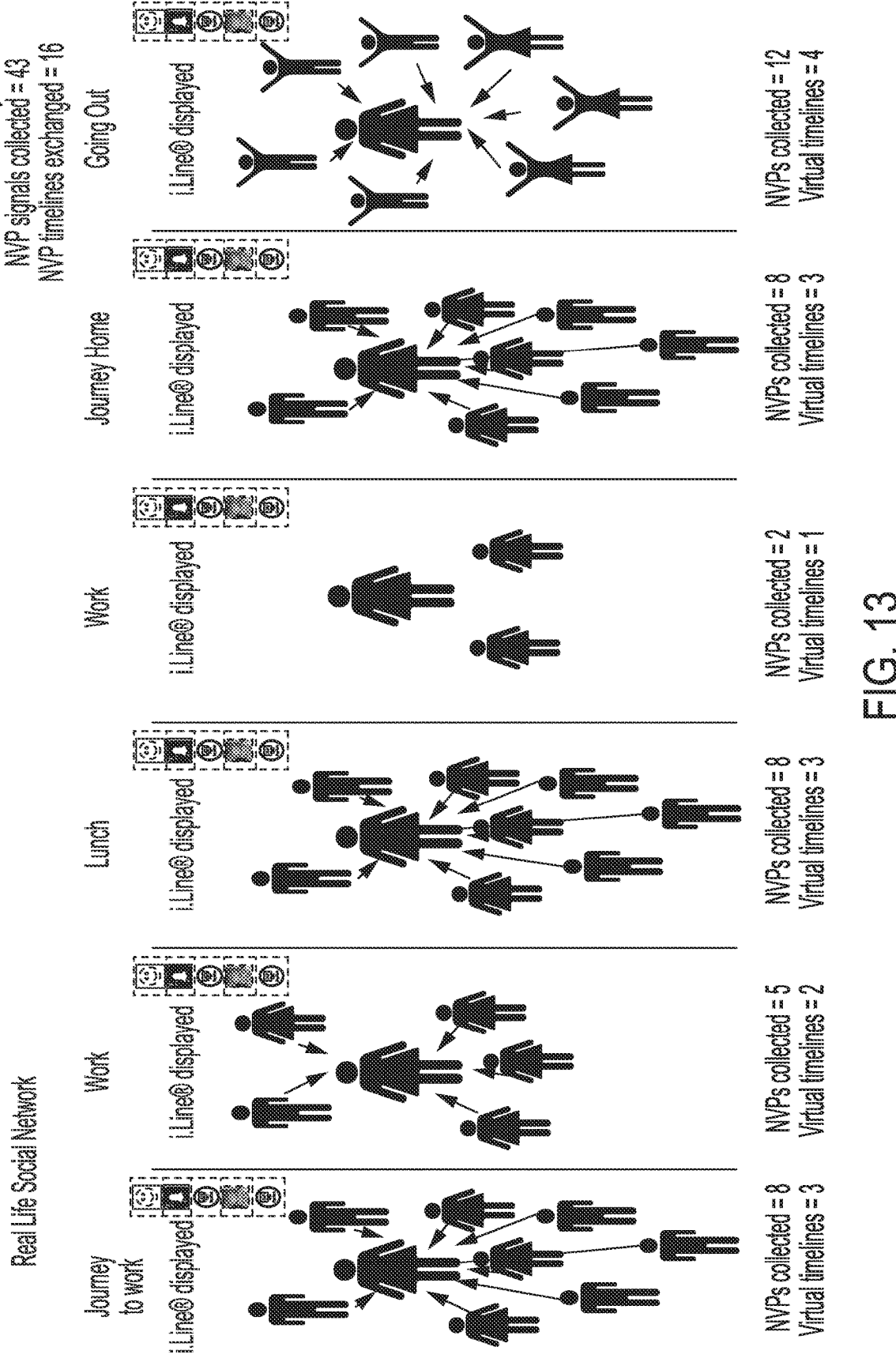
FIG. 13 illustrates an NVP influence map for ad-targeting in accordance with an aspect of the invention.

As illustrated in FIG. 13, girl A has collected 43 NVP signals and had 16 conversations about the NVP line she is displaying. If she has configured her NVP line correctly each person who has sent an NVP signal will have received her Virtual NVP Line. which was reacted to. Note that girl A had configured two NVP lines for different parts of her day. So different people will see different NVP line. What is clear is that as the NVP language and communication protocol becomes established the number of transactions will grow exponentially as each of the above people will have their own NVP badge and their own NVP line We will quickly see the emergence of the top real-life influencer in a daily basis. Advertisers will be able to target the most popular real time influencers based on NVP sharing activity.

In other embodiments, the advertising module or platform may further comprise a bidding module, wherein the advertisers bid among each other for engaging a user for incorporating a winning bid advertisement into the content message display of the user. Advertisers will be able to use the NVP Real Time Bidding Network to get access to the NVP line of targeted individuals if they have given their consent to take advertising in their NVP Line. These adverts will be clickable on the Virtual NVP line so they can be transferred from one user to many in the Real Life Network®. This potentially gives advertisers a major new network of people to target based on their location.

Application 2:

The NVP Store or Shop Controlling the NVP Content

Images will be able to be taken from a person's phone and shown on the NVP badge. As these are put onto the NVP line through the NVP App, we have control over the content and can manage any indecent, or inflammatory content. However, the final say will be with the NVP badge wearer. We will have complete control over the Virtual NVP line and be able to stop the distribution of any indecent or inflammatory content. Additionally, there will be a place to purchase widgets that link directly to apps such as Facebook, Twitter and other apps that have integrated with our NVP Llego Block. Brands, Apps and advertiser will have to pay to be allowed on the portal and be subject to our terms and conditions. We expect this fee to be a % of any purchase price or a fixed fee based on an individual's use. i.e. if the wearer wants to buy a specific logo or album cover, they can buy this for a one-off fee from the supplier. We would retain 10% of the retail revenue. This logo would be allowed to be used on the individuals NVP badge, but not be transferrable to another person NVP Line via the virtual NVP line which is read only.

The payment transaction system may incorporate block chain technology, wherein each NVP exchange or digital content purchase transaction among any user is represented as a unique node in the digital ledger, each node tagged with meta data facilitating at least one of a transaction, validation and, or registration for each NVP exchange or digital content purchase transaction. Alternate payment systems may be used, including linking directly to a credit card, debit card, and, or bank account.

In yet other embodiments, payment systems may include an intermediary or $3^{rd}$ party system providing payment processing between users or between user and the NVP store. An intermediary account or escrow-type account may also be used, whereby funds are disbursed from a user 1 account to a user 2 account, or from a user 1-linked intermediary account to a user 2 account—upon full satisfaction of transaction or bidding obligations. The intermediary account may be viewed as a pre-paid account. In other embodiments, digital sellers may target users who have pre-paid an intermediary account for a specific item, thereby competing over a particular purchaser for a specific item.

Moreover, in some embodiments, the NVP communication protocol standard may be incorporated into the payment transaction system coupled to the commerce platform or NVP store. For instance, a yellow square on the surround display or center display of the interactive badge may signify that the user is willing to purchase a digital content for download or a physical item. In other embodiments, the yellow square displayed may signify that after scanning a physical item tag, the user's account or intermediary account has a sufficient balance to afford the item. Contrastingly, a red square may indicate that the item may not be purchased based on available balance. In yet other embodiments, a green circle may signify that a payment transaction is confirmed.

To run through a potential scenario, two individuals have bought an interactive badge which runs the NVP language, communication protocol and programming language. Each one has programmed their badges to run a 6-image timeline changing every 30 seconds. They both get on a train in the morning and find themselves sitting opposite one another. Individual 1 sees that individual 2 has a green square framing their timeline of images and knows that this signifies that the person is open to a conversation, is open to receiving an NVP signal and is open to receiving a virtual NVP timeline from this person. Individual 1 decides to send a NVP signal which causes the individual 2's badge to display a 'Hi', beep a sounds and flash once as this is standard for the NVP badge.

Individual 1 approaches Individual 2 and starts to discuss their images. Individual 1 also decides to send their virtual NVP timeline to individual 2. At the end of the day Individual 1 and 2 are able to read how many people have sent them a message, from whom and about what. This scenario can happen at any time of the day and the individuals can change the NVP components in real time through their App. Furthermore, individual 1 or 2 can purchase specific digital content from a coupled commerce platform to be displayed on their NVP line or virtual NVP. What's more, advertisers may target either individual 1 and, or 2 for advertising display based on individual 1 and, or 2's tracked activity.
Moral and Legal Implications:

What happens if a person approaches another person in direct contradiction to the symbol being displayed? There needs to be method of creating sanctions or no-go areas. One component of the moral code is to set a rule saying that if a person is reported more than 3 times for infringing the person space their badge and account will be suspended. But what happens if the person does not have a badge and approaches the person with the approach symbol anyway.

What can be done in this circumstance? This is where a moral code needs to be created or at least set out. An unwritten rule which adheres to normal law is that a person has the right to tell the person that they do not want to talk even though they have that symbol displayed.

Additionally, how much personal information can be displayed on the interactive badge without it causing someone offence and who is monitoring, censoring and controlling this content? Through the app, we are able to control what is displayed on the device, but this requires monitoring at the server side and will require human intervention. Again, this is where the moral code component of the ecosystem comes into play. The alternative is to let the general public publish what they like on their own badges or displays. If this is offensive, is it covered under the relevant laws of the country? How much control should we exercise over the content displayed in public? Every badge sold should have an ethics card included which states our ethic culture and what can and cannot be displayed. If anyone is shown to be contravening, it would be seen as contravening badge sub-culture or badge mores.

FIGS. 14-23 illustrate device, process, and method flow diagrams for a device housing worn over a user configured for line-of-sight display of programmable content from a second device. The line-of-sight device (locket) with a housing may be configured for line-of-sight display of a first device, operably coupled to a second device for any programmable content to be consumed via the line-of-sight display. It will be appreciated by a person of ordinary skill in the art that the programmable content may be reconfigurable based on a pre-defined line-of-sight rule.

Preferably, the line-of-sight rule may mediate programmable content that may be at least one of shaped and, or colored symbols on the first devices visual display, communicating whether a user can approach at least another user or not for further digital interaction via the line-of-sight display. In yet other embodiments, the approach message via the line-of-sight display may include a standardized audio cue.

Figure 15:
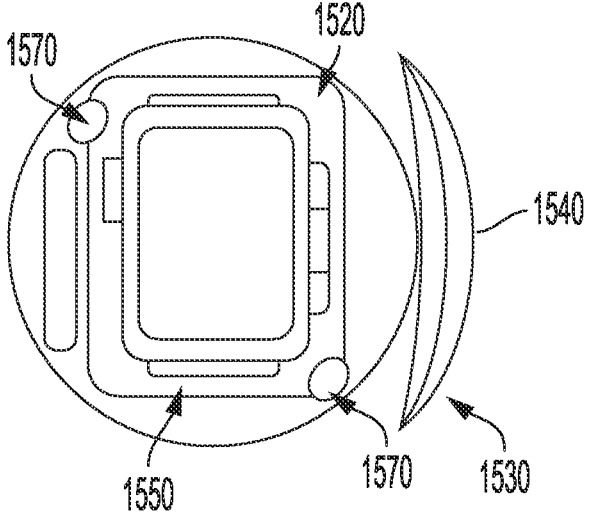
FIG. 15 illustrates a line-of-sight device in accordance with an aspect of the invention.
Figure 16:
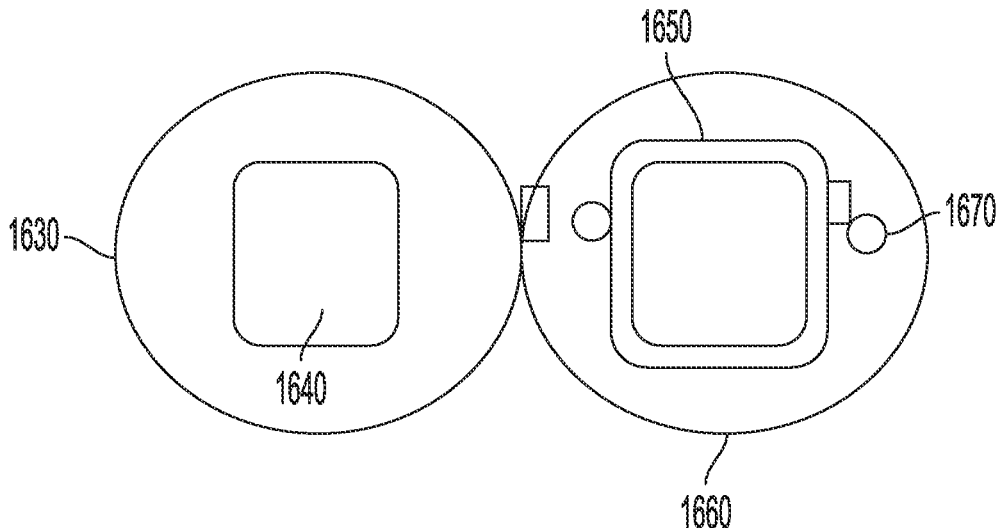
FIG. 16 illustrates a line-of-sight device in accordance with an aspect of the invention.

FIGS. 15 and 16 illustrate a front perspective view of a device configured for housing a first device for line-of-sight display in accordance with an aspect of the invention. FIG. 14 illustrates exemplary dimensions of the housing of the line-of-sight device. In one embodiment, a line-of-sight wearable device worn over a chest of a first user comprises a housing defining at least a first electronic device storage location 1520; a front wall 1530, 1630 on the housing having at least a portion 1440, 1540, 1640 to expose a display of the first electronic device 1550, 1650; a back wall on said housing configured to open to removably secure the first electronic device 1550, 1650 within the at least first electronic device storage location 1520; and the first electronic device 1550, 1650 that is pair-able wirelessly with a second electronic device, wherein at least one of a display or audio event on the first electronic device 1550, 1650 is caused programmably based on a pre-defined line-of-sight rule and the at least one of the display or audio event is exposed in a line-of-sight to at least a second user via any one of the walls of the housing worn over the chest of the first user.

In a preferred embodiment, the front wall 1530, 1630 may have at least a portion 1440, 1540, 1640 of the display configured to maximize display of the first electronic device 1550, 1650 display. The display portion 1440, 1540, 1640 may be a glass hemispheric dome 1440 covering the entire surface of the front wall 1530, 1630. In other embodiments, the display portion 1440, 1540, 1640 may be a flat glass screen covering the entire face of the front wall 1530, 1630. In other embodiments, a hemispheric dome 1440 or flat glass may just expose an amount required to display the first electronic device 1550, 1650 display. In yet other embodiments, the display portion 1440, 1540, 1640 may be a cut-away or through-wall of at least a dimension required to display the first electronic device 1550, 1650, and yet ensure that the first electronic device is securely stored within the housing.

As shown in FIGS. 15 and 16, a medium for enabling a short-range communication protocol 1570, 1670 between at least a coupled of devices is disposed on the back wall 1660 of the housing. The mobile communication device, such as a mobile phone (second electronic device), may be paired with a smart watch or another type of mobile communication device (first electronic device) using any protocol. In a preferred embodiment, the medium 1570, 1670 is an infrared sender and receiver for enabling the pairing between the at least couple of devices, such as the mobile phone and smart watch. Any person of ordinary skill in the art can appreciate that any number of protocols and mediums may be exploited to facilitate the pairing of the smart watch and mobile phone. Examples of the short range wireless communication medium include Bluetooth, ZigBee, Infrared, Near Field Communication (NFC) and, or Radio-frequency identification (RFID). Likewise, line-of-sight devices may interact with other line-of-sight devices using a short-range communication protocol, such as Infrared, Bluetooth, Zig-Bee, NFC, and, or RFID. In similar fashion, a person of ordinary skill in the art may also appreciate the fact that any number of small form-factor devices with high-order processing and a display may be used as the first electronic device 1550, 1650 housed with the line-of-sight device, without departing from the scope of the invention.

While not shown in FIG. 16, FIG. 15 shows an exemplary location in which the first electronic device 1550, 1650 may be docked. Embedded within the housing of the line-of-sight device is a first device storage location 1520. The first electronic device may be securely inserted into the storage 1520 within the device housing by unlatching or opening the front wall 1530, 1630 or back wall 1660 of the device. The front wall 1530, 1630 or back wall 1660 may open by way of a hinged latch that allows the latch to swing swing open to expose the at least one first electronic device storage location 1520 or swing close to securely close the back wall. Once opened and revealed, the first electronic device 1550, 1650 may be placed and secured back-surface down—either font-loaded (secured on the back surface of the front wall 1530, 1630) or back-loaded (secured on the top surface of the back wall 1660). The display surface of the first electronic device 1550, 1650 is positioned up, in order to expose the display via the display portion 1540, 1640 of the line-of-sight device. In other embodiments, the line-of-sight device may not have a front wall 1530, 1630 or back wall 1660 that unlatches or opens, but rather, accepts the first electronic device 1550, 1650 via a slot (not shown) on a top wall of the line-of-sight device. The user may slide the first electronic device 1550, 1650 into the top wall slot in such a fashion so as to expose the first electronic device 1550, 1650 display via the line-of-sight device display portion 1540, 1640. In such an embodiment, the back surface of the first electronic device 1550, 1650, such as a smart watch, may still be facing the back wall 1660 of the line-of-sight device. Furthermore, the smart watch or any first electronic device 1550, 1650 may be removed by lifting or press-releasing the overhang portion of the smart watch housing or strap from the top wall slot of the line-of-sight device. In yet other embodiments, the first device or smart watch 1550, 1650 may be inserted through a through-wall on the front wall 1530, 1630 or back wall 1660 for securing into place, obviating the need for inserting into a top wall slot or opening to separate the front wall 1530, 1630 from the back wall 1660, 1760 for front-loading or back-loading. The person of ordinary skill in the art may appreciate that any number of alternate methods for revealing the storage location 1520 for docking the first electronic device 1550, 1650 may be possible.

Figure 17:
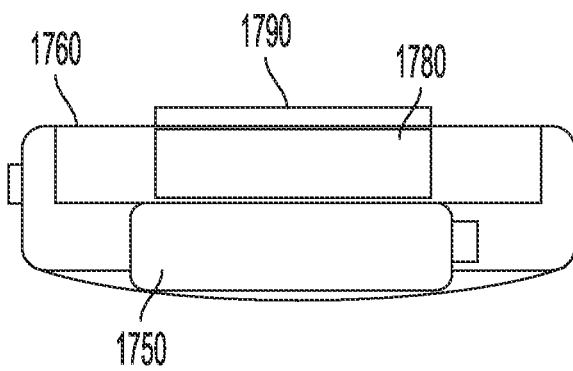
FIG. 17 illustrates a line-of-sight device in accordance with an aspect of the invention.
Figure 18:
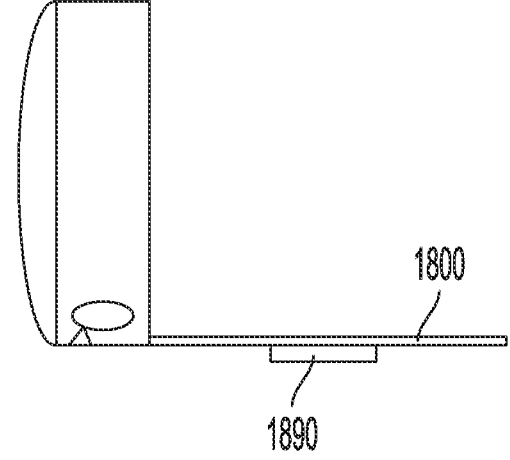
FIG. 18 illustrates a line-of-sight device in accordance with an aspect of the invention.

FIGS. 17 and 18 illustrate a top perspective view of the line-of-sight device in accordance with an aspect of the invention. Once the first electronic device 1750 is docked or housed within the first electronic device storage location, it may be secured by any number of methods. As shown in FIGS. 17 and 18, the first electronic device 1750 (smart watch) is secured in place by a magnet 1790, 1890 disposed on the back wall 1760, 1860 of the line-of-sight device. In other embodiments, the magnet 1790, 1890 may still be disposed on the back wall 1760, 1860, but within the line-of-sight device housing. In such embodiments, the magnet 1790, 1890 may be positioned forward or rear of the line-of-sight device circuit board 1780. In yet other embodiments, the first electronic device 1750 may be secured within the storage location by any one of a clip, thread, slot, etc.

As shown in FIGS. 17 and 18, the housing of the line-of-sight device is in a circular shape of roughly 6 cm in diameter. This dimension is roughly the smallest form-factor to accommodate a smart watch as the first electronic device 1750. However, any sized circular device or housing may be used to effectuate display of any type of a first device 1750, without departing from the scope of the invention. Moreover, the device or housing may be configured in any one of a substantially square, circular, rectangular, or triangular shape, wherein corner edges are round or sharp and planar surfaces are any one of flat, concave, convex, or hollow (through-walled).

Though not shown in FIG. 17 or 18, the line-of-sight device may be configured in the form of a locket, wherein the locket is coupled to a strap to be worn over a neck of the user. By being worn over the neck of the user, the line-of-sight device may be positioned over the chest of the user for optimal display to any other user within eye-shot. Any number of methods for positioning the line-of-sight device to optimize line-of-sight display to at least a second user may be employed, without departing from the claimed invention. For instance, the line-of-sight device may not be coupled to a strap, but rather, be simply clipped, adhered, magnetically adhered, or fastened to a shirt over the chest of the user. In other embodiments, the line-of-sight device may be clipped, adhered, magnetically adhered, or fastened to a hat or head-wear worn over the head of the user. In yet other embodiments, the device may be embedded or woven into a fabric of any one of a shirt and, or hat of the user.

Figure 19:
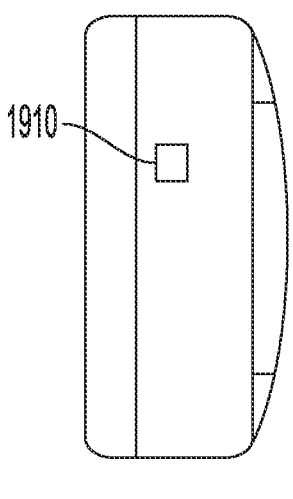
FIG. 19 illustrates a line-of-sight device in accordance with an aspect of the invention.
Figure 20:
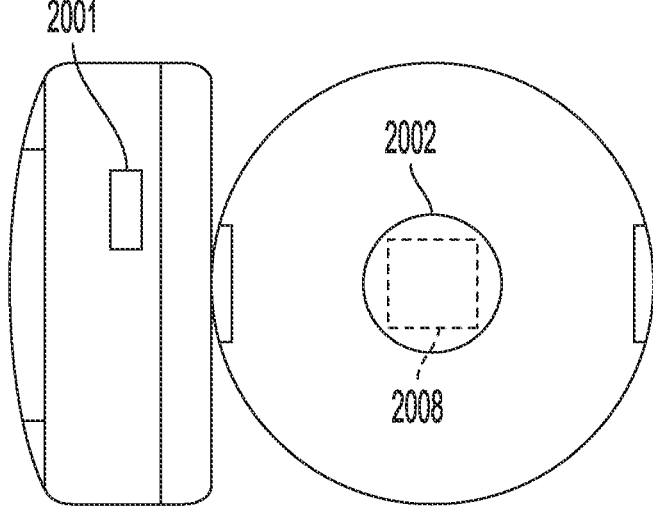
FIG. 20 illustrates a line-of-sight device in accordance with an aspect of the invention.

FIGS. 19 and 20 depict side views of the line-of-sight device in accordance with an aspect of the invention. As shown, on the right or left side, at around 90 degrees to perpendicular, there is a button 1910, 2010 which allows for a digital message or event from one line-of-sight device to be transmitted to at least one other proximal line-of-sight device—contingent on pre-defined rules and configurations. Not shown are two sensor housings disposed on either the front wall or back wall housing an infrared sender and receiver to enable communication between at least one of line-of-sight device to any line-of-sight device; line-of-sight device to any first device; line-of-sight device to any second device; first device to any first device; or first device to any second device. In other embodiments, the above communication scenarios may be achieved by any one of, or combination of, short-range communication protocols. The button 1910, 2010 may also double as a power on or off for the line-of-sight device.

In continuing reference to FIGS. 19 and 20, the line-of-sight device may have two power sources. The first may be contained within the housing of the device (not shown). The second may be a battery that powers the line-of-sight device connection to the second device (smartphone) via Bluetooth and, or the infrared sender and receiver (not shown). The battery has the capacity for at least a day's operation and is fully rechargeable. The line-of-sight device circuit board 2008 comprises an infra-red receiver and sender, a processor, a blue tooth wireless module, and battery management. The memory and software is programmed directly to the on-board processor. This software allows the line-of-sight device to send a user's unique identification and for the receiver's line-of-sight device to decode that unique identification and retrieve the profile data from the server.

Figure 21:
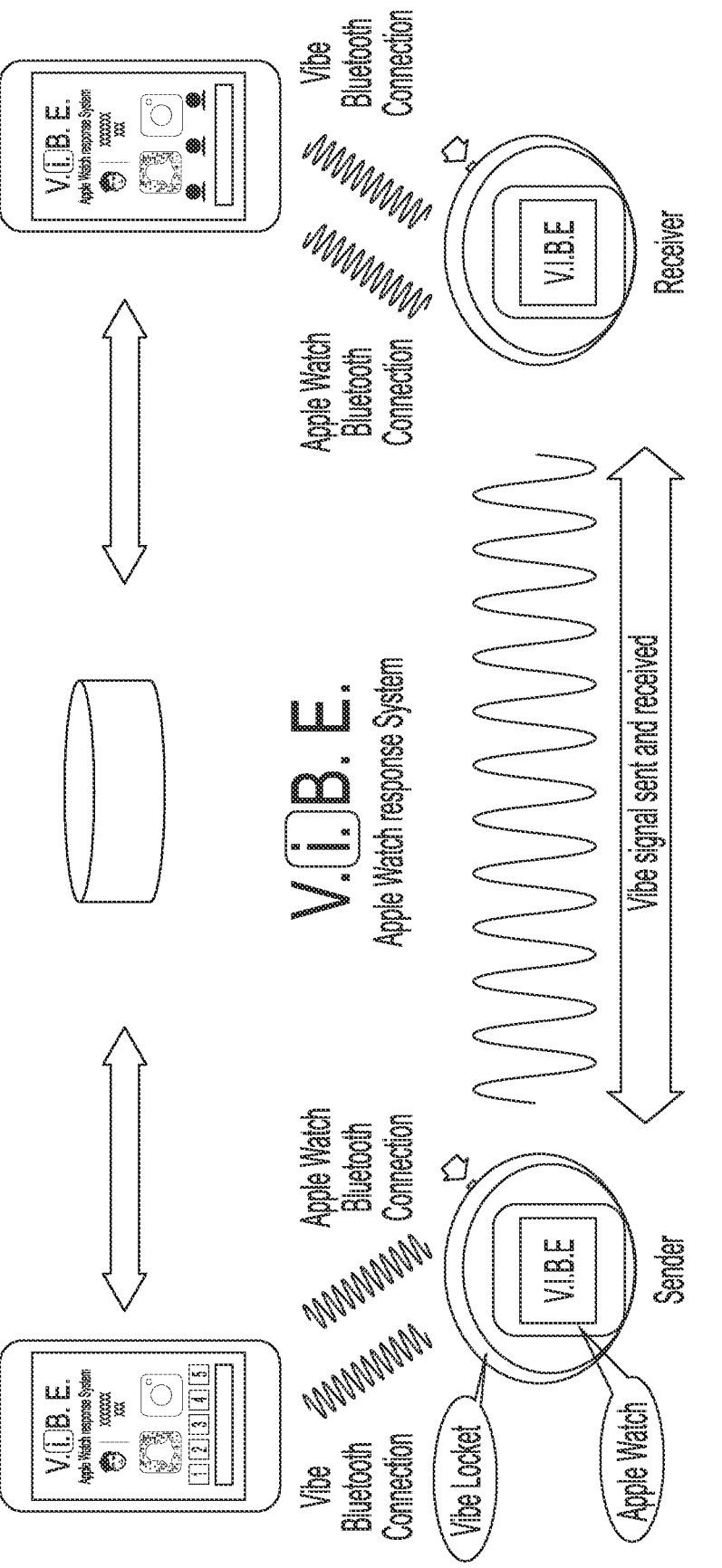
FIG. 21 illustrates a process flow for a line-of-sight display in accordance with an aspect of the invention.
Figure 22:
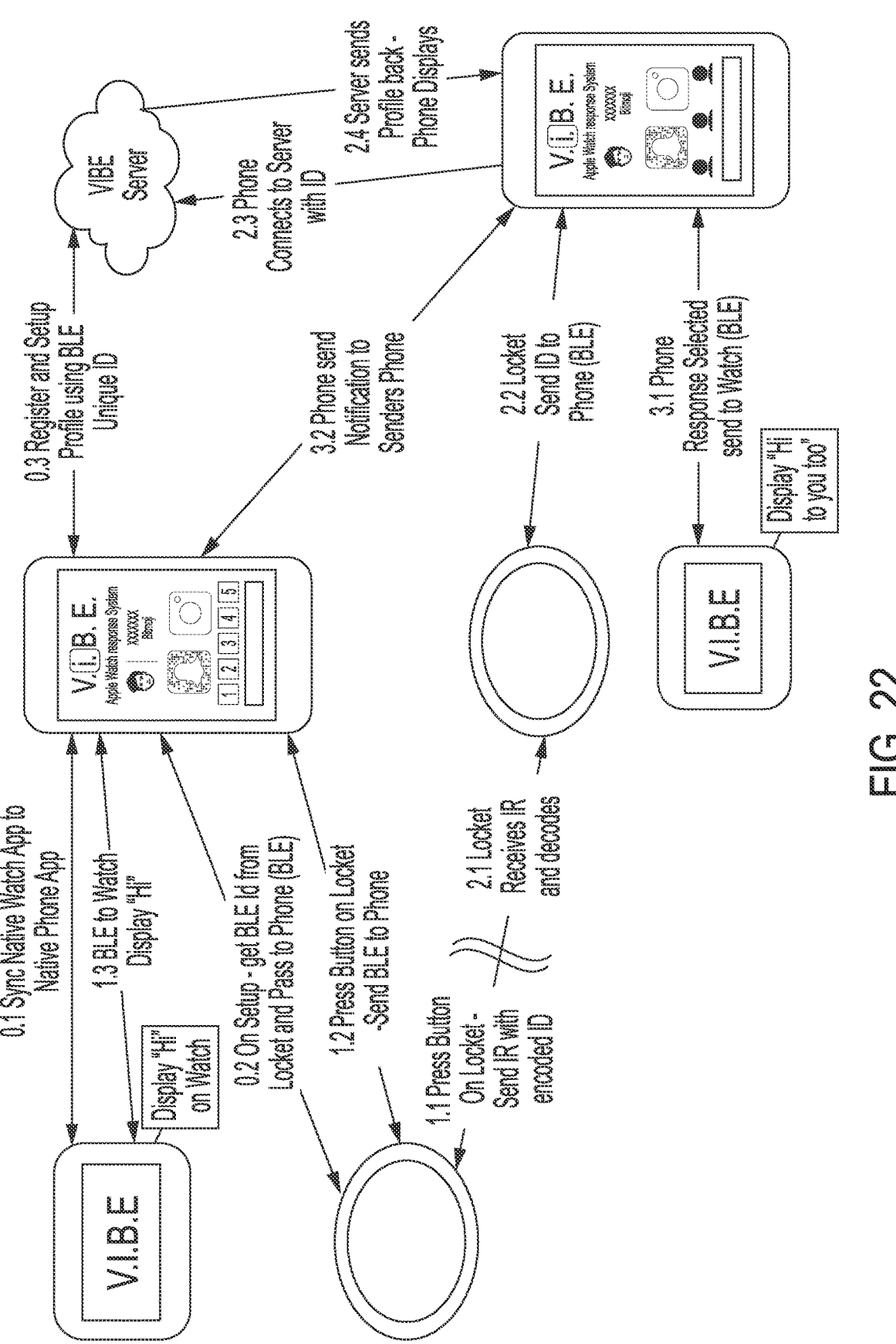
FIG. 22 illustrates a process flow for a line-of-sight display in accordance with an aspect of the invention.

Now in reference to FIGS. 21 and 22. They each illustrate an exemplary interaction or process flow between devices in accordance with an aspect of the invention. The line-of-sight device may not interact without the app on the second device (smartphone) running the protocol. The users smartphone must have the line-of-sight software running on the smartphone and the users first device (smartwatch), and optionally, the line-of-sight device must be paired with the smartphone and the line-of-sight device app. The smartphone app sends the display aspects based on the interaction to the smartwatch device. This process is not connected to the circuit board, but happens separately. The infrared module allows for sending and receiving infrared signals over a distance of 15 meters with significant accuracy. The line-of-sight device includes a directional hood that allows the infrared beam to be targeted at other users very accurately. The infrared receiver has a wide receiving angle to trap incoming signals. The infrared signal carries a 4-byte code in hexadecimal which enables the code to be coded and decoded when being sent. The send button activates the send signal for the infrared sender and this sends the users unique ID to the receiver line-of-sight device.

In continuing reference to FIGS. 21 and 22, a non-verbal line-of-sight electronic communication system is disclosed. The system may comprise a line of sight wearable device to be worn over a chest of a first user, wherein the device may further comprise a housing defining at least a first electronic device storage location with a front wall or back wall configured to open to removably secure the first electronic device within the at least first electronic device storage location, and pair-able wirelessly with the first user's second electronic device. In an exemplary embodiment, the first device may be a smartwatch and the second device may be smartphone. The system further comprises a processor; a non-transitory storage element coupled to the processor; encoded instructions stored in the non-transitory storage element, wherein the encoded instructions when implemented by the processor, configure the system to: upload interaction rules and curated content for display on the first device based on the first user's interaction rules and scheduler criteria exposed in a line-of-sight to at least a second user via the line of sight device worn over the chest of the first user; send at least one of an interaction and, or content message based on the first user's interaction rules and scheduler criteria to at least one of a second user's device within range and contingent on the second user's interaction rules; and based on the second user's interaction rules, accept or deny the first user interaction message, and if accepted, decode a unique tag to trigger a unique digital event. In a preferred embodiment, the digital event may be at least one of an image, video, sound, vibration, flash, signal, symbol, color, text, sequence, upload, download on any one of the user's first device visual display.

In other embodiments, the triggered unique digital event may be a curated line of static, dynamic, and, or scheduled images and, or video content from at least one of the user's to be displayed on at least one of the user's first device display exposed via the line-of-sight wearable device. In yet other embodiments, the displayed curated line of static, dynamic, and, or scheduled images and, or video content is further replicated on at least one of a digital and, or virtual presence of at least one the users.

In other embodiments, a line-of-sight electronic communication system may comprise a line-of-sight wearable device housing defining at least a first electronic device storage location configured to removably secure the first electronic device; at least a short range network coupling the first electronic device and a proximal second electronic device; to trigger a unique digital event; and wherein the triggered unique digital event is at least one of curated line of static, dynamic, and, or scheduled images and, or video content from at least one of the user's to be displayed on at least one of the users first device display exposed via the line-of-sight wearable device.

The digital event triggered from the interaction rules may be a display of any combination of shapes and, or colors chosen or pre-defined to signify a permission to approach or activate a further digital content interaction on any first device or line-of-sight device. For instance, a green circle might suggest permission to approach, and a blue square contained therein may suggest a permission to exchange an NVP (user curated) line of content. Choice of colors, symbols, and the interaction with each, may be purely arbitrary or pre-defined in accordance with a standardized protocol. In order to allow a user to program at least one of their line-of-sight device, first device (smartwatch) or second device (smartphone), a programming interface is required which allows the user to set up the language and run it throughout a day as a timeline. In a preferred embodiment, the user decides to program at least one of the device, first device, or second device with the NVP language; the program which runs on the paired smartphone is opened and the language variables are displayed; the NVP language components can be selected; the ability to send a communication to another user can be selected; and the ability to send the entre NVP users timeline can be selected. Additionally, the NVP program allows the user to select images from their own images, from the NVP store, feeds from interfaces with social media applications, from adverts selected from the NVP advertising platform, from health devices, from games, music and programming from a specific GPS location. Additionally, the amount of time an image is displayed may be programmed with the resulting timeline transmitted from the device to the line-of-sight device/smartwatch. The process for setting the rules of interaction and engagement is further set out in FIG. 9. Once the NVP time line is set, this is transmitted to the badge and can be altered in real time. An example of this in vertical format is shown in FIG. 10. Alternatively, the line of NVP content may be depicted or scrolled in a horizontal fashion.

The system allows one user who is wearing the line-of-sight device over the chest—in the line of sight of another user wearing the same—to send messages wirelessly based on the NVP displayed. The message can only be sent if the NVP is set to the correct parameters set out in the NVP language section of this document. The NVP protocol has a unique number attached which allows the receiving line-of-sight device/smartwatch to decode it and activate an event such as but not limited to an image display, a sound played, a vibration, or a signal sent back to the sender or a signal being sent to the parent smartphone, which in turn activates an event.

This NVP signal is defined as a wireless signal sent from one line-of-sight device/smartwatch to another over a certain physical distance in line of sight. Using the NVP signal, any number of line-of-sight device/smartwatch can send any number of NVP signals to any number of receiving line-of-sight devices/smartwatches. The NVP signal can only be accepted if the correct NVP symbols are being displayed. By accepting an NVP signal, this can trigger the line-of-sight device/smartwatch to programmably display a set of shaped and, or colored symbols, communicating whether a first user can approach at least a second user or not for further digital interaction. Standardized or customized sound or tactile cues may also be activated to denote a permission to approach. Further digital interaction or a triggered digital event may be an exchange of NVP (user curated) line of content. Other examples of digital interaction or a triggered digital event may be a set of offers, adverts, images, videos or sounds. Further yet, another type of digital interaction or triggered digital event may comprise at least one of an offer and acceptance of at least a credit, between at least two devices, redeemable towards at least one of a good or service with any one of a participating vendor. Alternatively, the offer and acceptance may be a representation of at least one of a good or service, between at least two devices, redeemable towards at least one of a physical good or service associated with the representation from any one of a participating vendor. Furthermore, the digital interaction or digital event may further comprise facilitating a payment transaction between at least one of a device-to-device, device-to-vendor POS terminal, or device-to-vendor product code. In a preferred embodiment, the interaction or event is a relayed signal or data structure via at least one of the IR sender/receiver of device, device-QR code associated with the product subject to transaction, or device-POS terminal receiver.

Line-of-Sight Device: Smartphone: Smartwatch App Pairing

For each device that is placed within the line-of-sight device, the correct syncing app must run. This is to ensure that the NVP protocol and communication language is running and active. The smartwatch app controls the display of the colored symbols and NVP language on the smartwatch. The line-of-sight device software works in conjunction with the smartphone app to control the sending and receiving of infrared signals with a special encoded signal that identifies the user. This encoded signal is sent via Bluetooth back to the smartphone, which in turn uses the encoded signal to retrieve profile data from the server.

```
Line-of-Sight Device: Smartphone: Smartwatch Technical Routines
Line-of-Sight Hardware
    Arduino BLE
    IR Button
    Init
        BLE Send Rqst to Watch App "Give me ID"
        Wait( )
        BLE Receive Watch ID - store
    Loop( )
        Button Pressed
        Send IR containing Watch ID
        Send BLE to App "I've sent a vibe"      {Optional}
        Check for IR Received
        Decode IR to get Watch ID
        Send BLE to App "I've been Vibed by". ID
Smartphone APP
    Need an Android & iPhone App for each watch type
    Register
        Select Watch Type - BLE Connect to watch "Give me ID"
        Enter Details of User, picture etc.
        Send to server and create Profile
    Login
        Login details - verify - get watch type
        BLE Connect to watch
    Home:
        Display Static page
        BLE Polling
    BLE Received from Locket
        "Give me ID"
        BLE Send to Watch "Give me ID"
        BLE Receive from Watch ID
```

-continued
```
        BLE Send ID to Locket
        "I've sent a vibe"
        Add to stats - date and time of Vibe
        BLE to Watch "Vibe Sent"
    "I've been Vibed by". ID
        Connect to Server - Get profile of user with ID
        Display Profile Page
        Button Options 'OK' - 'NO' - 'Ignore'
            'Ignore'
    Time out after n minutes and return to home
            'OK'
                BLE to Watch "Thanks for Hi"
    Enter Messaging mode- send Message
            'NO'
                BLE to Watch "No thanks"
Watch APP
    Display 'Vibe' home screen
    BLE Receive from APP
        "Give me ID"
        Get Unique ID
        BLE Send Watch ID
        "Thanks for Hi"
            Display a 'Hi to you too'
        "No thanks"
            Display "XX No thanks"
        "Vibe Sent"
            Display 'Hi'
```

Figure 23:
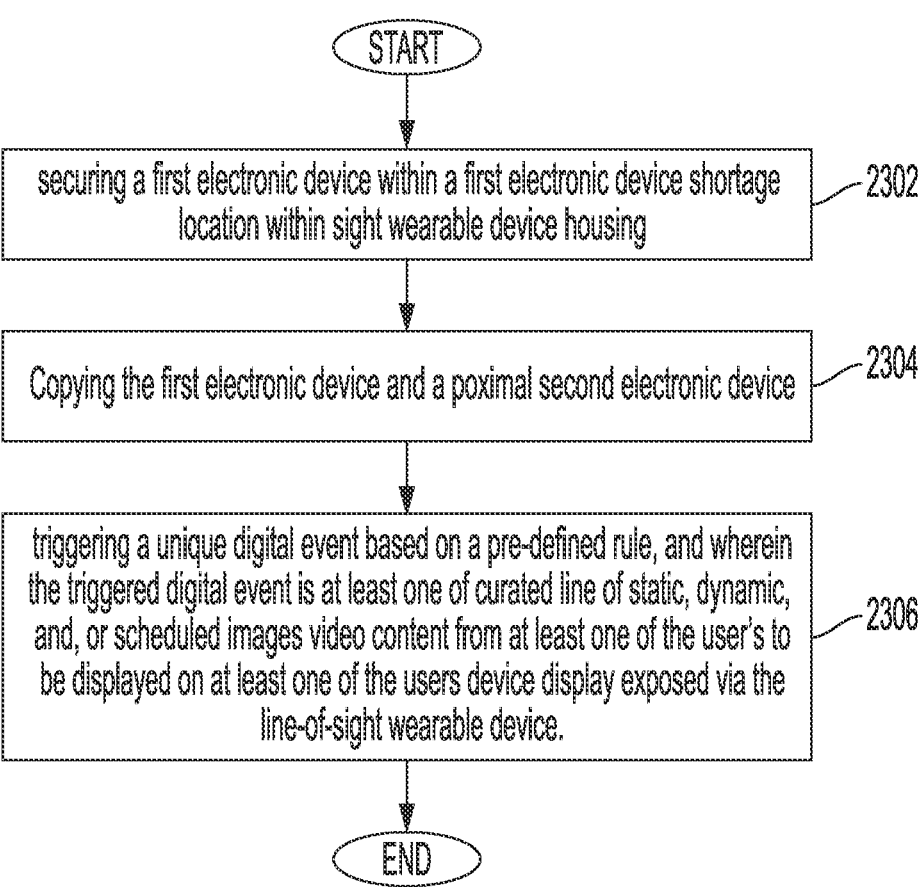
FIG. 23 illustrates a method for housing a first device for line-of-sight display in accordance with an aspect of the invention.

FIG. 23 illustrates a method for triggering a content display via a line-of-sight wearable device comprising the steps of: securing a first electronic device within a first electronic device storage location within a line-of-sight wearable device housing (2302); coupling the first electronic device and a proximal second electronic device (2304); and triggering a unique digital event based on a pre-defined rule, and wherein the triggered unique digital event is at least one of curated line of static, dynamic, and, or scheduled images and, or video content from at least one of the user's to be displayed on at least one of the users first device display exposed via the line-of-sight wearable device (2306).

Figures 24A, 24B:
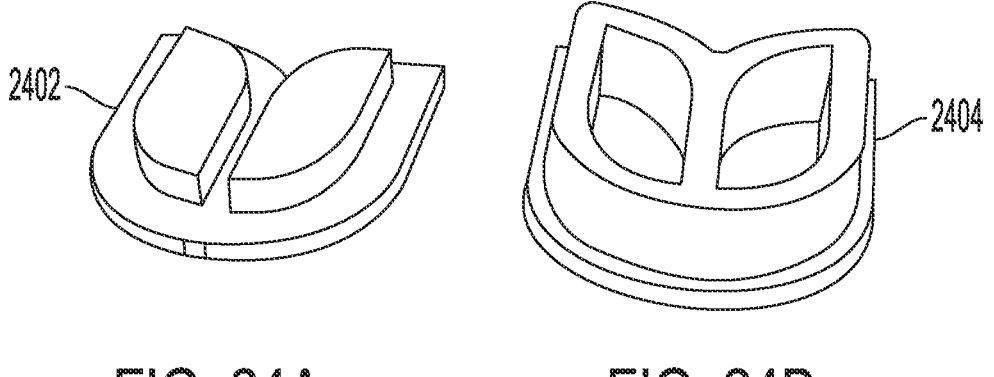
FIG. 24*a* illustrates a front perspective of a keepsake housing for device embedding in accordance with an aspect of the invention.
FIG. 24*b* illustrates a front perspective of a keepsake housing for device embedding in accordance with an aspect of the invention.

Now in reference to FIGS. 24a and 24b, each of which illustrate an exemplary complementary element or surface, whereupon joined, form a clear enclosure or housing configured for active/mobile display of any item. In an exemplary embodiment, the housing is configured for receiving/housing a keepsake item in any number of form and further embedded in a device for keepsake display. In an exemplary embodiment, the device is any device that comprises a form capable of embedding the keepsake housing of any shape and further displaying any number of types and expressions of keepsake. For instance, any number of eyewear, prescriptive or protective, may feature a single lens that has a portion (out of a user's field of view) embedded with the clear housing/enclosure comprising the keepsake in pulverized form. Such display in line-of-sight of at least another individual. Examples of keepsakes may be any physical item with historical, sentimental, and/or emotional value, reduced to fit. As shown in FIGS. 24a and 24b, each illustrate a complementary element, joined to form the clear enclosure or housing for display of the keepsake. A first element 2402 may be perceived as a top element or cap, preferably comprised of a clear acrylic-type material, to be fitted over the second element 2404 of the same material, filled with a pulverized keepsake, forming the enclosure or housing. In these particular illustrations, the cap 2402 and filled element 2404 are complementary in form, creating a joinery for a more secure housing. Furthermore, as can be seen, the elements to be joined form a housing in a shape of a logo or mark of a brand—either of the device manufacturer embedding the housing or of the individual, event or organization being commemorated. It is to be appreciated by a person of ordinary skill in the art that any number of joineries of elements may be possible, forming a clear housing of any number of shapes or designs for the keepsake display. It is also to be appreciated that the housing may be a single continuous element formed in conjunction with a keepsake or prior to being fed the keepsake—rather than joined elements as illustrated in FIGS. 24*a* and 24*b*.

Figure 25A:
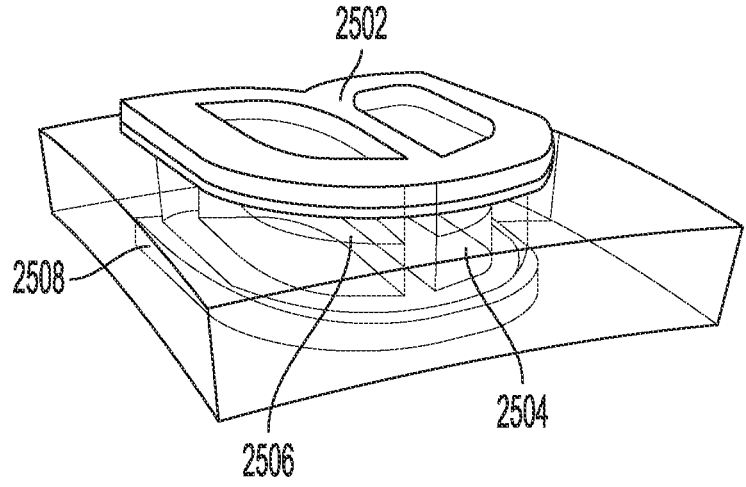
FIG. 25*a* illustrates a colored top perspective of a keepsake housing embedded in a device in accordance with an aspect of the invention.
Figure 25B:
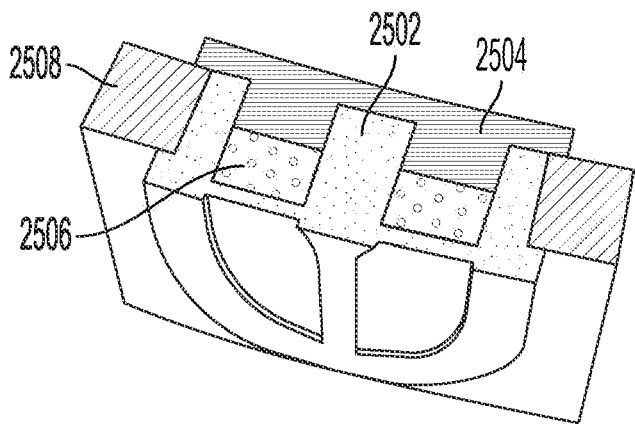
FIG. 25*b* illustrates a colored bottom perspective of a keepsake housing embedded in a device in accordance with an aspect of the invention.

With respect to FIGS. 25*a* and 25*b*, both of which illustrate varying perspectives of an exemplary implementation of the mobile keepsake display concept, particularly differentiating the various components of the keepsake housing embedded in a lens of an eyewear through use of color-coded illustrations. FIG. 25*a*, in particular, depicts a top perspective and cross-sectioned view of a portion of the lens embedded with the keepsake housing, illustrating the first and second element, and the resulting cavity for housing the keepsake by virtue of the element/joinery design. FIG. 25*b* depicts a bottom-up perspective and cross-sectioned view. Again, it bears further reiteration that the housing for any device implementation need not require a plurality of elements with male-and-female joinery, but rather just be any continuous, single transparent enclosure for housing the keepsake display.

In continuing reference to FIGS. 25*a* and 25*b*, illustrated are varying perspectives of an eyewear implementation of the embedded keepsake. In a preferred embodiment, the apparatus comprises: a first surface or element 2502 (illustratively green) with at least a portion that is clear; a second element 2504 (illustratively blue) with at least a portion that is clear; said first element 2502 joined with said second element 2504 to form a keepsake housing with a cavity 2506; said cavity 2506 filled with a pulverized expression of the keepsake for display via the clear portions of any one of the first 2502 or second element 2504; and the filled keepsake housing embedded within at least one of a housing, display, control pad, control key, frame, or lens of a wearable apparatus for display of the keepsake.

Figure 26B:
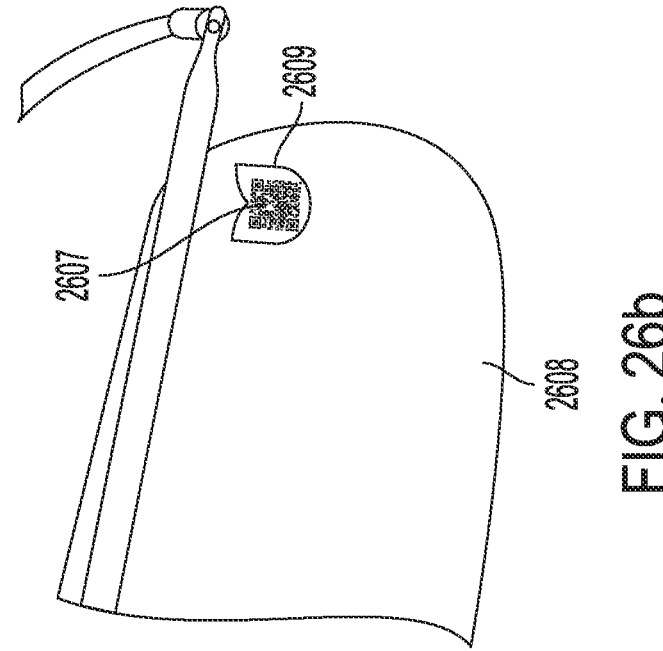
FIG. 26*b* illustrates a line-of-sight wearable device (eyewear) with an embedded keepsake in accordance with an aspect of the invention.
Figure 26A:
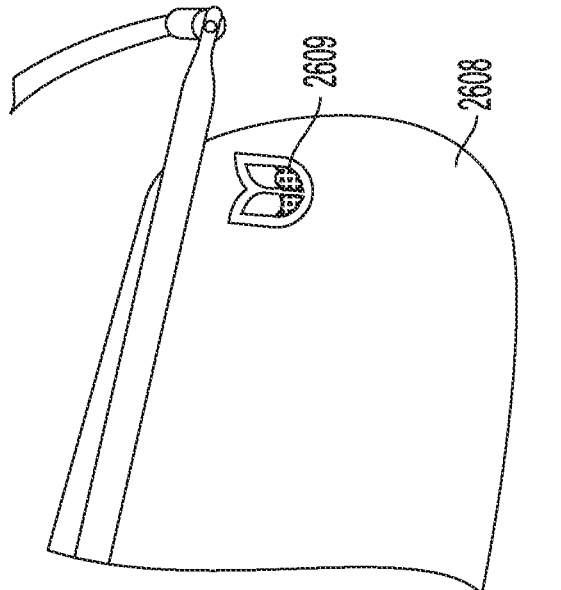
FIG. 26*a* illustrates a line-of-sight wearable device (eyewear) with an embedded keepsake in accordance with an aspect of the invention.

In further illustration of the eyewear implementation, FIG. 26*a* illustrates a close-up, front perspective of a portion of an eyewear lens featuring a through-lens or aperture dimensioned to securely receive or embed the keepsake housing for line-of-sight to others. In other embodiments, the keepsake-filled housing is not embedded via a through-lens, through-housing or aperture, but instead affixed or attached in any conventional way. In continuing reference to FIG. 26*a*, the peripheral location of the embedding 2609 on the lens 2608 allows for minimal view obstruction, while still prominently displaying the keepsake to others. While not shown in FIG. 26*a*, other devices, allowing for a user to wear, operate, or carry on their person (mobile) for line-of-sight display (eyewear, watch, bracelet, mobile device, ear phones, hat, shirt, bag, footwear, uniform, vehicle feature, outerwear, ring, ear/neck/head ornaments or accessories) or stow-away/on-request display (card stowed in wallet or bag) may be implemented for keepsake embedding as well.

Figure 27:
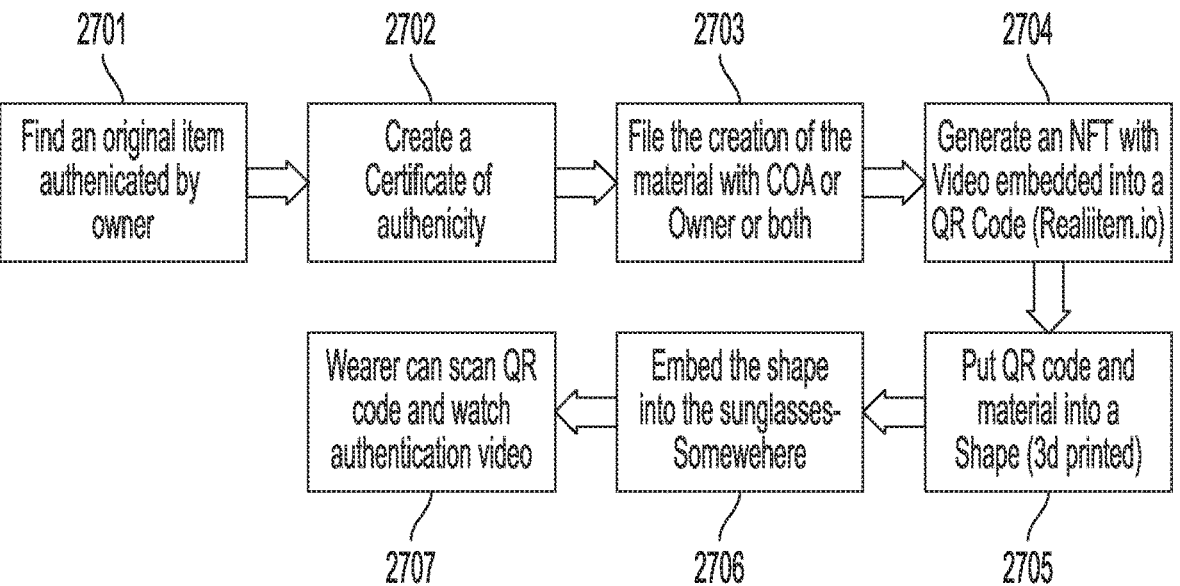
FIG. 27 illustrates a method of embedding the keepsake in accordance with an aspect of the invention.

FIG. 27 illustrates a method of embedding a keepsake-filled housing for mobile display of the keepsake, comprising the steps of: forming a clear enclosure or housing for display of the keepsake; and embedding said housing onto any visible portion of any device for display of the keepsake. This mobile (worn, operated, or carried) display of the keepsake may include for any upon-request display—a wallet-carried card embedded with the keepsake or a car-dash mounted or embedded amenity featuring a driving-inspired commemorative or a dedicated display featuring the commemorative. The keepsake is some expression of the commemorative item, whether in discreet portions, identifiable or marked portions, or as described in FIG. 27, optionally, in pulverized form of varying granularity.

For instance, the Indy 500™, the crown jewel of the Triple Crown of Motorsports, is held annually at the Indianapolis Motor Speedway, affectionately known as the "Brickyard" by legions of petrol heads. It has been called the "Brickyard" since 1911, when the brick-paved race track was inaugurated. Steeped in tradition, there remains a square yard of the original brick pavement to this day. Hypothetically, the event could further commemorate the $110^{th}$ run of the event, scheduled for May of 2026, by housing a portion of the original brick into a keepsake housing in the shape of the number 110—or 500/110. In other embodiments, the Indy 500™ may market a commemorative $110^{th}$ run of the event by embedding the "brickyard" keepsake housing in the shape of the iconic rectangular track into the lens of a "Indy 500" limited edition Renauld™ sunglass. In another embodiment, the Firestone™ brand could hypothetically market a "Indy 500" limited edition "low profile" tire by embedding the "brickyard" keepsake housing into the outer wall of the tire, in the design of the Firestone™ color mark. Any physical items (even biological items: hair, ashes, blood, nail, DNA, etc.) may be pulverized or physically/chemically reduced into a form for housing and embedding into any mobile display whether embedded in a line-of-sight item (lens of an eyewear, tongue or sole of a footwear, etc.) or upon-request item (wallet-stowed card, etc.).

Figure 28:
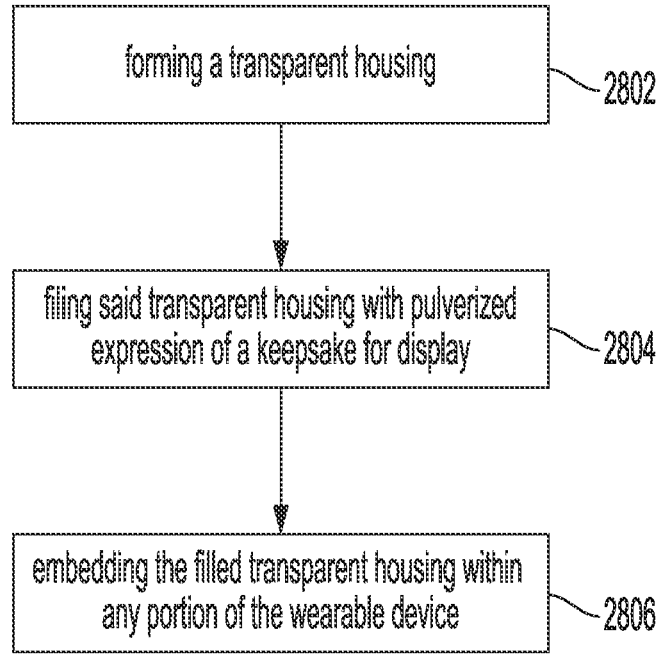
FIG. 28 illustrates a method of digitally authenticating the embedded keepsake in accordance with an aspect of the invention.

To address matters of authenticity, the keepsake housing may further be marked, tagged, embedded, coated, or printed with an element that is configured to be transmitted, scanned, or relayed for downstream decoding and initiating further approval required digital events, such as verification of item, chain of custody, item facts, purchasing facts, sharing item related content, etc. In one embodiment, the digital event triggering element is a scan-ready code, like a QR code, enabling a user to scan the code to be directed to a registry verifying the item and providing any pertinent information of the item or event in any medium or format, such as a digital ledger, digital certificate of authenticity, video, or any other digital asset pertinent to issues of authenticity. In other embodiments, NFT's may be adopted as a means to verify authenticity and the limited edition nature. The triggering elements may be made to form-fit the keepsake housing displaying the keepsake. In yet other embodiments, the triggering element may be featured on the device housing or display, adjacent to the keepsake housing, in order to accommodate a larger triggering element. As illustrated in FIG. 28, depicting an exemplary flow or routine for digitally authenticating the keepsake, comprising the steps of: creating a digital certificate of authenticity with industry standard encryption/decryption methods; recording photographic or videographic proof authenticity 2801-2803; and registering such proofs of authenticity on a decentralized ledger 2804-2807.

Returning to our scenario of the "brickyard" edition of a Renauld Sixty-One, a considerable secondary market may exist for embedded keepsake items, and to that end, authenticating the pulverized brick is crucial. As shown in FIG. 26*b*, a QR code 2607 may be printed or adhered to a back surface of the keepsake housing embedding 2609 in the lens 2608 of the eyewear. Upon being scanned, a user wishing to authenticate the keepsake—brick from the original brickyard—to trigger a digital event. In one example, the digital event triggered may be being directed to a URL of authentication: PIN, Video, Tick box etc. While not shown in FIG.

26*b*, other embodiments may feature a RFID tag on the back surface of the embedded keepsake or housing for scanning by a mobile device NFC scanner to trigger the digital event/s. It is to be appreciated that any number of elements configured for scanning and triggering any digital event related to authentication—or non-authentication related—of the embedded keepsake may be implemented. The NASCAR collector, with a simple scan, can rest assure that the keepsake in question-brick from the iconic "brickyard"—is in fact a genuine piece of NASCAR history.

Figure 29A:
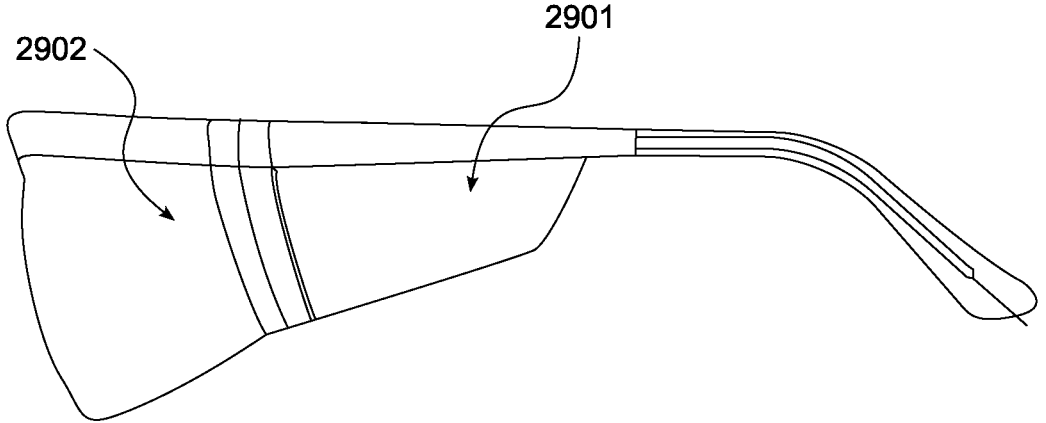
FIG. 29*a* illustrates a colored top perspective of a keepsake housing in wearable form-factor in accordance with an aspect of the invention.
Figure 29B:
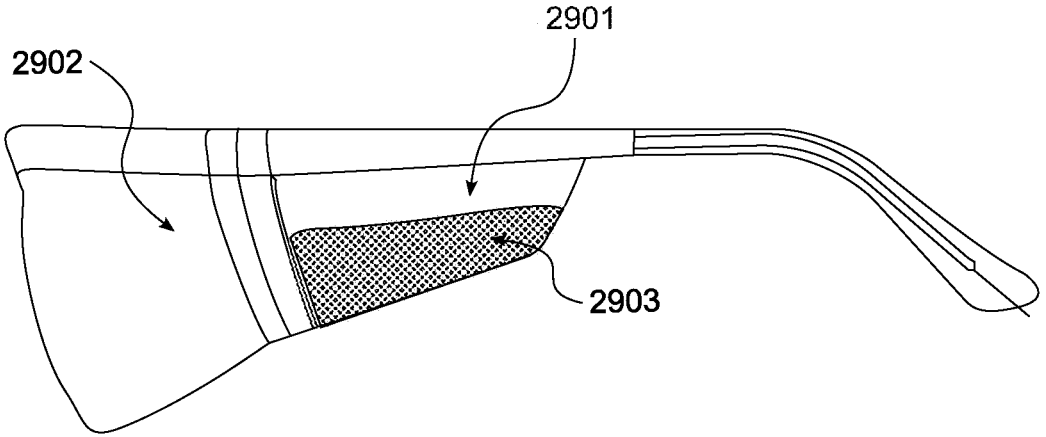
FIG. 29*b* illustrates a colored bottom perspective of a keepsake housing in wearable form-factor in accordance with an aspect of the invention.

Now, in reference to FIGS. 29*a* and 29*b*, which each illustrate an exemplary 'form-factored' keepsake display in accordance with an aspect of the invention, the first and second surfaces of the side shield are configured to align seamlessly. They form a clear enclosure using an interlocking mechanism reminiscent of the one described in the 'embedded' display of FIG. 24*a* and FIG. 24*b*. To explain in detail, one surface may feature a recessed edge, while the opposite surface boasts a protruding edge designed to fit perfectly within the recessed edge of the first. This interlocking construction allows for a secure, snap-fit connection between the two surfaces, effectively enclosing the keepsake within. This ensures a firm, waterproof fit that is resilient against the everyday rigors of wear and tear. The transparency of the surfaces allows for a clear view into the enclosure, making the enclosed keepsake—which can be a pulverized item of historical or emotional value—a prominent feature. This visibility is further augmented by the large surface area that the side shield provides. Alternatively, the structural element comprising the wearable may double as a unified keepsake display, without need for two individual pieces interlocked. In other words, the entire structural element may serve as the keepsake display.

While not illustrated, alternative embodiments of the invention could see the keepsake enclosure adopting the form-factor of other elements of the wearable apparatus, such as the nose bridge, ear piece, or the frame of spectacles. Regardless of the element in question, the fundamental design principles remain the same: two surfaces or unitary, fabricated from a clear, durable material, come together to form a hermetically sealed enclosure, effectively housing the keepsake. For instance, when the keepsake enclosure takes the shape of a spectacle frame, the entire frame could consist of a first and second surface that interlock to secure the keepsake. With this arrangement, the keepsake is visible from both the front and the sides, offering greater visibility compared to the side shield embodiment.

Similarly, in an embodiment where the keepsake enclosure is a nose bridge, the keepsake display would be positioned front and center on the wearer's face. Depending on the nature of the keepsake and the wearer's personal preference, this central positioning could offer unique aesthetic appeal and increased visibility. Each alternative embodiment retains the scanning feature for authentication and the capability to uncouple the enclosure from the wearable apparatus, facilitating either repair or transfer. Regardless of the form-factor, the keepsake is showcased in a secure, innovative, and deeply personal manner.

Figure 30A:
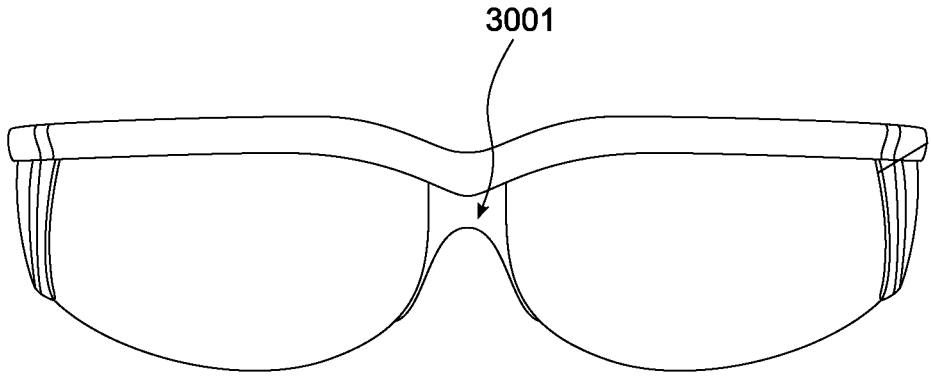
FIG. 30*a* illustrates a line-of-sight wearable device (eyewear) with form-factor display of the keepsake in accordance with an aspect of the invention.
Figure 30B:
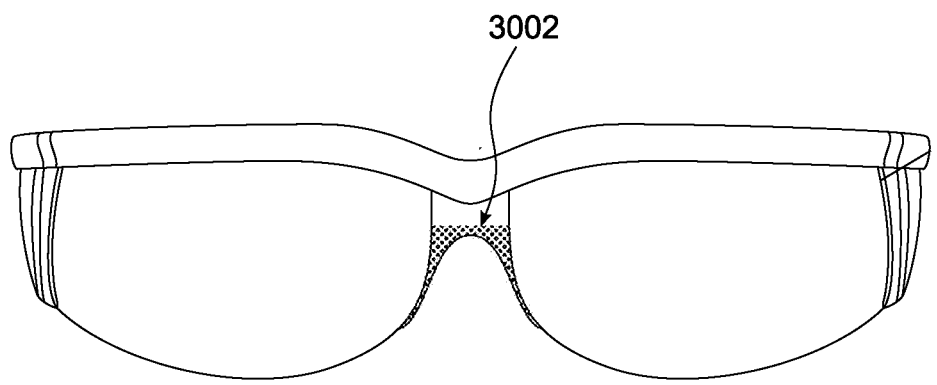
FIG. 30*b* illustrates a line-of-sight wearable device (eyewear) with form-factor display of the keepsake in accordance with an aspect of the invention.

Now, while FIGS. 30*a* and 30*b* illustrate an embodiment of the keepsake display where the side shield of eyewear serves as the form-factor, the principles of the invention are not limited to this configuration. In alternative embodiments, other elements of eyewear can also be utilized. For instance, the transparent enclosure could be shaped to mimic the form-factor of a nose bridge or the frame of the eyewear. Each of these embodiments would follow similar principles, with the specific component of the eyewear being replaced with a 'form-factored' keepsake housing.

The invention's utility is not limited to eyewear; it has the flexibility to be integrated into a range of wearable items. Some feasible iterations might comprise components of wristwatches, such as the dial or strap, pieces of jewelry like a necklace's pendant or a ring's centerpiece, and even accents on accessories, for instance, a belt's buckle or a bag's strap. Elements on shirts, like buttons or cufflinks, can also house the keepsake. Additionally, a clear casing can be seamlessly embedded into clothing items, be it a tee or a hat. In these designs, the existing wearable component is substituted or adjusted with a see-through chamber that secures the keepsake. This transparent chamber is crafted not just to protect and showcase the keepsake but also to resonate with the design and utility of the wearable. The material used for this chamber can be tailored based on aesthetic appeal and longevity. This innovative keepsake presentation method provides a versatile solution, allowing cherished tokens to be seamlessly incorporated into daily wearables, serving as a perpetual and distinct memento for its user.

Now continuing from FIGS. 30*a* and 30*b*, while not shown, alternative embodiments of the 'form-factored' keepsake display apparatus may include other wearables or personal accessories, beyond eyewear. For instance, in reference to headphones, an embodiment of the invention may comprise the earmuffs or the outer shell of the headphones to act as the clear enclosure. The keepsake, which could vary in form from pulverized to more solid representations, would be housed within this transparent section of the headphones. This would allow for visibility of the keepsake, serving as a constant reminder of the object's significance to the user, while maintaining the headphone's primary function of audio delivery.

Similarly, the invention could be embodied in mobile device protectors or cases. The enclosure housing the keepsake could replace a section or the entirety of the protective case. This transparent enclosure within the case would then hold the keepsake, allowing the user to view the keepsake whenever the device is in use or even when simply carrying it. These embodiments, while not illustrated in the figures, further demonstrate the adaptability of the 'form-factored' keepsake display concept to different wearable items or personal accessories, always ensuring visibility and meaningful interaction with the keepsake. The transparent enclosure can effectively integrate with the structural integrity of the wearable or personal accessory, without impeding its primary function.

Figure 31:
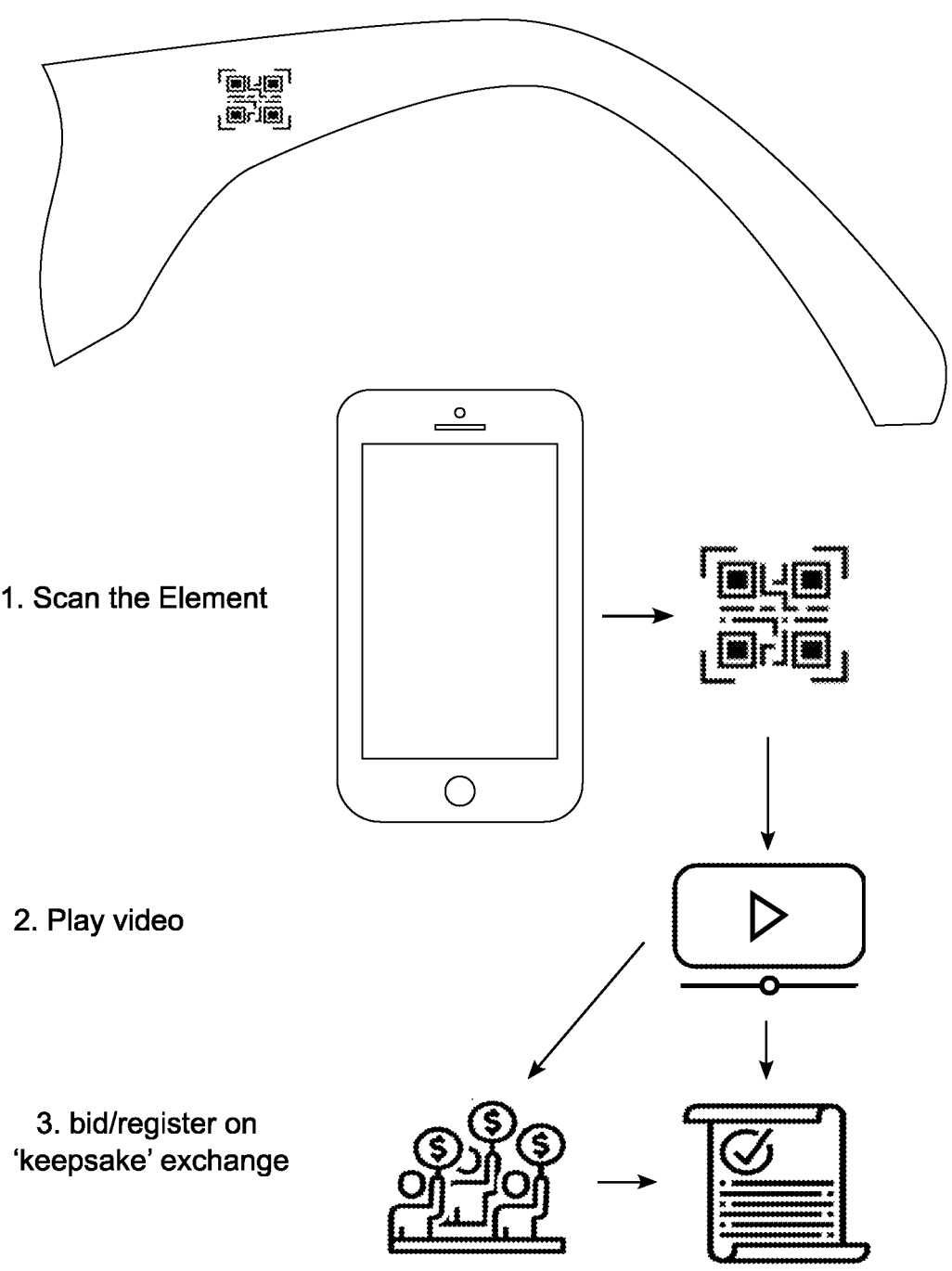
FIG. 31 illustrates a method of form-factoring the keepsake in accordance with an aspect of the invention.

Now in reference to FIG. 31, which illustrates an exemplary process flow of the scanning element and digital authentication process involved in the 'form-factored' keepsake display. The process begins with the keepsake, which can be any physical item of significance, being digitally scanned and recorded onto a secure digital ledger. The use of a digital ledger, akin to blockchain technology, ensures the authenticity and chain of custody of the keepsake from original extraction to miniaturizing, pulverizing, or enclosing it within the form-factored display.

The digital ledger information can be tokenized to form a non-fungible token (NFT), a unique digital asset tied to the keepsake, thereby giving it a distinctive digital signature. The keepsake's NFT provides an immutable record of the keepsake's journey, documenting every point of purchase or change of custodianship. This implementation of NFTs not only serves as proof of authenticity, but also as a digital form of provenance. The keepsake's information is stored on a network server that is accessible through a unique link tied to a scanning element embedded within the form-factored keepsake display. The scanning element could be a QR code or any other machine-readable code that, when scanned, provides access to the digital ledger information of the keepsake, its tokenized digital asset (the NFT), and potentially a video of the keepsake in its native environment.

To exemplify this process, let's imagine a scenario involving the estate of a fictitious famed musician, "Star Strummer", renowned for his iconic guitar pick. To commemorate Strummer's legacy, his estate decides to miniaturize and enclose a portion of his last used guitar pick in a limited edition eyewear's side shield, the eyewear being similar to the one Star Strummer famously wore. The guitar pick, now a keepsake, undergoes the process outlined in FIG. 31. It's scanned, digitally recorded, and its journey tracked and authenticated using the digital ledger and NFT technology. A scanning element, potentially located on the edge of the side shield of the eyewear, is linked to this digital data. Fans or collectors of Star Strummer's legacy can purchase the commemorative eyewear, and by scanning the element on the side shield, can view the NFT data on a network server. This verifies the authenticity of the guitar pick keepsake and allows them to view a video of Strummer using the pick in his last performance, thereby establishing a personal connection to Strummer's legacy.

In an alternative embodiment, the scanning element could be placed at different locations on the side shield, such as the top edge, ensuring ease of access while maintaining the aesthetic of the eyewear. This exemplary process flow highlights the capability of 'form-factored' keepsake displays to provide not just physical, but also digital interaction and authentication.

Now, revisiting the reference to FIG. 31, let's re-envision the scenario with additional context for the famed musician "Star Strummer" and his iconic association with a pair of oversized side shielded Renauld sunglasses. Strummer, famous for his legendary guitar solos, had a distinctive style not just in music, but also in fashion. His iconic Renauld sunglasses, characterized by their oversized side shields, were as much a part of his identity as his music. These sunglasses, with their sleek design and distinctive form factor, protected his eyes from stage lights and the glare of his adoring fans' spotlights. Moreover, they added an air of mystique and became a symbol of his signature style.

The Renauld 'Sixty-One' sunglasses Strummer wore were unique, featuring clear side shields providing a full peripheral view, an essential feature for Strummer during his performances. The frames had a robust, matte finish, contrasted by the transparent side shields and tinted lenses. Together, they created a memorable and striking appearance that fans immediately associated with Star Strummer. With this unique association between Star Strummer and his Renauld sunglasses, his estate sees a fitting tribute in embedding his last used guitar pick into the side shields of the commemorative eyewear. The guitar pick, either preserved in its whole form or pulverized into a powder, is encased within a clear enclosure embedded in the side shield, making it a visible memento for fans and collectors.

In this context, the process outlined in FIG. 31 unfolds. The keepsake undergoes scanning, digital recording, and its journey from the stage to the eyewear is tracked and authenticated using digital ledger and NFT technology. The scanning element, potentially embedded discretely on the inner edge of the side shield, provides a link to this digital record. Upon scanning, purchasers of the commemorative eyewear can access the keepsake's NFT data on a network server, verifying the authenticity of the guitar pick and viewing a video of Strummer's last performance using the pick. This digital interaction, combined with the physical keepsake, allows fans to connect personally with Star Strummer's legacy in a unique, authenticated manner.

Additionally, the registering of the token may be done on a purpose-built digital ledger. A purpose-built exchange platform, designed for facilitating the buying and selling of 'form-factored' or 'embedded' keepsakes over a decentralized ledger, could serve as an influential marketplace and a significant advertising platform. This exchange would offer a curated space where individuals can browse, bid, and trade unique keepsakes, each authenticated by embedded digital data. The incorporation of a bidding feature would add an exciting dynamic to the platform, allowing users to engage in auctions for highly coveted keepsakes, thus creating a vibrant, interactive community.

The keepsake's digital ledger and non-fungible token (NFT) information could be accessed directly within the exchange platform, providing immediate verification of authenticity and history of ownership. This transparency would not only foster trust but also enhance the perceived value of the keepsakes, encouraging more active participation in bidding.

From an advertising standpoint, the exchange platform offers substantial opportunities. Advertisers could align themselves with popular keepsakes or high-profile auctions, sponsoring these listings to gain extensive brand exposure. This strategic placement of sponsored content could be directly linked to a keepsake's legacy, thereby creating a compelling story that resonates with potential bidders.

Additionally, the platform could leverage user data to allow for targeted advertising. By analyzing users' browsing, bidding, and buying patterns, ads could be tailored more effectively to individual interests. This could, in turn, drive engagement within the platform and generate higher conversion rates for advertisers. The combination of a dynamic bidding environment with the allure of authenticated keepsakes makes this purpose-built exchange an enticing platform for advertising and user engagement.

Within the multifaceted digital exchange platform of the present invention, one of the standout features pertains to the intricate role of the advertiser's module. This module is not a mere sideline functionality but plays a central part in shaping the user experience, enhancing the intrinsic value of the keepsakes, and even influencing the bidding dynamics: Integrated Non-Fungible Token (NFT) Registration System: This foundational feature ensures the authenticity and lineage of every 'form-factored' or 'embedded' keepsake is transparently communicated, bolstering the platform's credibility; Dynamic Bidding Module: This real-time auction experience keeps users engaged. As bids are placed, the momentum is palpable, creating an environment of excitement and anticipation; Sophisticated Sponsored Content Mechanism: At the heart of the platform's innovation is the sponsored content mechanism. Advertisers can strategically align with specific keepsakes, crafting narratives that intertwine their brand's essence with the keepsake's story. This rich content doesn't just promote products but elevates the allure of the keepsake, thereby indirectly influencing the fervor and intensity of the bidding process; Analytics-driven Advertising Module: Advertisements, driven by user behavior and preferences, are seamlessly integrated into the platform. As users bid, they are presented with content that resonates with their profile and the nature of the keepsake. This personalized ad experience often sways the bidder's emotional connection to the item, making them more likely to place higher bids; Direct Linkage & Enhanced Storytelling: Advertisers are empowered to create compelling stories that bridge their product or service with a keepsake's legacy. This narrative-driven approach is key in enhancing user engagement, often eliciting stronger emotional connections to the keepsake and making the bidding wars more intense; Feedback Integration with Advertising Metrics: The platform, ever-evolving, continuously refines its advertising content based on real-time user responses, ensuring optimal resonance and a dynamic auction environment.

Sarah and Jake, passionate about music memorabilia, discover the coveted "Strummer Glastonbury Festival Guitar Pick Keepsake" on the platform. The guitar pick, believed to have been used by Joe Strummer in the iconic 1980s Glastonbury Festival, was embedded within a chic wristband. As Sarah places an initial bid, the sponsored content mechanism swings into action. An advertisement from a top-tier music brand pops up, weaving a tale about their new line of vintage-inspired headphones, hinting that they were crafted to commemorate legendary moments just like Strummer's performance at Glastonbury. The advertisement subtly suggests that owning both the headphones and the keepsake would be the perfect homage to the era. Jake, reading this narrative and feeling the connection between the product, the event, and the keepsake, is further encouraged to outbid Sarah. He sees an additional value in the combination of the guitar pick and the headphones, influenced by the clever advertising narrative. The bidding becomes not just about the keepsake but about reliving and owning a piece of music history. Throughout their bidding duel, the platform's advanced advertising modules ensure that both Sarah and Jake are constantly fed narratives and products that strengthen their desire for the keepsake. The intertwining of curated advertisements and the keepsake's history makes the auction an immersive and emotionally charged experience.

Embodiments are described at least in part herein with reference to flowchart illustrations and/or block diagrams of methods, systems, and computer program products and data structures according to embodiments of the disclosure. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

I claim:

1. An eyewear with an integrated keepsake display, comprising:

a transparent enclosure;

said transparent enclosure permanently integrated as a non-removable structural element of the eyewear, wherein the structural element is at least one of a side shield, nose bridge, ear piece, or frame of the eyewear; and said non-removable structural element filled with a keepsake intended for outward display, wherein the keepsake comprises a material physically derived from a source material associated with a specific person, place, event, or structure.

2. The apparatus of claim 1, wherein the keepsake is pulverized into varying levels of granularity.

3. The apparatus of claim 1, wherein the element is an article of the eyewear serving a structural or design function.

4. The apparatus of claim 3, wherein the element is a side shield of the eyewear.

5. The apparatus of claim 4, wherein the side shield is the clear enclosure housing the keepsake.

6. The apparatus of claim 1, further comprising a scanning element enabling a user to scan the element to verify an authentication including for at least one of a status, origination, or chain of custody of the keepsake over a network.

7. The apparatus of claim 6, wherein the authentication including for at least one of a status, origination, or chain of custody of the keepsake is derived from an immutable ledger.

8. The apparatus of claim 7, further comprising a means for enabling removal of the keepsake housing from any one of the wearable device for repair or wearable device transfer.

9. A method for an integrated keepsake display, said method comprising the steps of:

forming a transparent enclosure;

integrating said enclosure into a non-removable structural element of an article or item; and filling said non-removable structural element with a keepsake for outward display, wherein the keepsake is any material physically derived from a source material associated with a specific person, place, event, or structure.

10. The method of claim 9, wherein the keepsake is pulverized into varying levels of granularity.

11. The method of claim 9, wherein the element is an article of the eyewear serving a structural or design function.

12. The method of claim 9, wherein the element is a side shield of the eyewear.

13. The method of claim 12, wherein the side shield is the clear enclosure housing the keepsake.

14. The method of claim 9, further comprising a scanning element enabling a user to scan the element to verify an authentication including for at least one of a status, origination, or chain of custody of the keepsake over a network.

15. The method of claim 14, wherein the authentication including for at least one of a status, origination, or chain of custody of the keepsake is derived from an immutable ledger.

16. The method of claim 14, wherein the scanning further comprises authenticating a membership status of a user.

17. The method of claim 14, wherein the scanning accesses a digital exchange for the buying and/or selling of 'form-factored' or 'embedded' keepsakes.

18. The method of claim 17, wherein the 'embedded' keepsake comprises a clear enclosure filled with the keepsake as a display, and said keepsake display embedded into an apparatus.

19. The method of claim 18, wherein the apparatus is an eyewear, and the keepsake display is embedded into at least one of the eyewear lens, frame, temple, temple tips, or bridge.

* * * * *